US012762651B2

(12) United States Patent
Hu et al.

(10) Patent No.: US 12,762,651 B2
(45) Date of Patent: Oct. 13, 2026

(54) STYLED IMAGE GENERATION METHOD, MODEL TRAINING METHOD, APPARATUS, DEVICE, AND MEDIUM

(71) Applicant: Beijing Bytedance Network Technology Co., Ltd., Beijing (CN)

(72) Inventors: Xinghong Hu, Beijing (CN); Chunji Yin, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 508 days.

(21) Appl. No.: 18/029,338

(22) PCT Filed: Aug. 27, 2021

(86) PCT No.: PCT/CN2021/114947

§ 371 (c)(1), (2) Date: Mar. 29, 2023

(87) PCT Pub. No.: WO2022/068487

PCT Pub. Date: Apr. 7, 2022

(65) Prior Publication Data

US 2023/0401682 A1 Dec. 14, 2023

(30) Foreign Application Priority Data

Sep. 30, 2020 (CN) ........................ 202011063185.2

(51) Int. Cl.
*G06V 40/16* (2022.01)
*G06T 5/50* (2006.01)
(Continued)

(52) U.S. Cl.
CPC .................. *G06T 5/50* (2013.01); *G06T 5/70* (2024.01); *G06V 10/774* (2022.01);
(Continued)

(58) Field of Classification Search
CPC ... G06T 5/50; G06T 5/70; G06T 2207/20081; G06T 2207/20084; G06T 2207/20221;
(Continued)

(56) References Cited

U.S. PATENT DOCUMENTS

2013/0346588 A1 12/2013 Zhang et al.
2014/0375540 A1 12/2014 Ackerman et al.
(Continued)

FOREIGN PATENT DOCUMENTS

CN 101075291 A 11/2007
CN 102156887 A 8/2011
(Continued)

OTHER PUBLICATIONS

International Search Report and Written Opinion for PCT/CN2021/117199, mailed on Dec. 17, 2021, 14 pages.
(Continued)

*Primary Examiner* — Phuoc Tran
(74) *Attorney, Agent, or Firm* — Astute IP Law Group

(57) ABSTRACT

A styled image generation method, a model training method, an apparatus, a device, and a medium are provided. The styled image generation method comprises: obtaining an original human face image; using a pre-trained styled image generation model, and obtaining a target styled human face image corresponding to the original human face image; wherein the styled image generation model is trained and obtained on the basis of a plurality of original human face sample images and a plurality of target styled human face sample images, the plurality of target styled human face sample images being generated by a pre-trained image generation model, and the image generation model being trained and obtained on the basis of a plurality of pre-acquired standard styled human face sample images.

17 Claims, 9 Drawing Sheets

(51) Int. Cl.
*G06T 5/70* (2024.01)
*G06V 10/774* (2022.01)

(52) U.S. Cl.
CPC .......... *G06V 40/165* (2022.01); *G06V 40/171* (2022.01); *G06T 2207/20081* (2013.01); *G06T 2207/20084* (2013.01); *G06T 2207/20221* (2013.01); *G06T 2207/20224* (2013.01); *G06T 2207/30201* (2013.01)

(58) Field of Classification Search
CPC . G06T 2207/20224; G06T 2207/30201; G06T 7/11; G06T 2207/20132; G06V 10/774; G06V 40/165; G06V 40/171; G06V 10/82; G06F 18/214
See application file for complete search history.

(56) References Cited

U.S. PATENT DOCUMENTS

| | | | | |
|---|---|---|---|---|
| 2020/0285896 | A1 | 9/2020 | Huang et al. | |
| 2020/0302154 | A1 | 9/2020 | Chen et al. | |
| 2022/0028139 | A1* | 1/2022 | Mitra | G06V 40/175 |
| 2022/0076374 | A1* | 3/2022 | Li | G06T 3/10 |
| 2022/0101577 | A1* | 3/2022 | Chakrabarty | G06T 7/11 |
| 2023/0086573 | A1* | 3/2023 | Naito | G06N 3/045 382/155 |

FOREIGN PATENT DOCUMENTS

| | | | |
|---|---|---|---|
| CN | 105452936 | A | 3/2016 |
| CN | 106874861 | A | 6/2017 |
| CN | 108021979 | A | 5/2018 |
| CN | 108446667 | A | 8/2018 |
| CN | 108829893 | A | 11/2018 |
| CN | 108846793 | A | 11/2018 |
| CN | 109308681 | A | 2/2019 |
| CN | 109508669 | A | 3/2019 |
| CN | 109829396 | A | 5/2019 |
| CN | 109859295 | A | 6/2019 |
| CN | 110136216 | A | 8/2019 |
| CN | 110363060 | A | 10/2019 |
| CN | 110555896 | A | 12/2019 |
| CN | 110838084 | A | 2/2020 |
| CN | 111126155 | A | 5/2020 |
| CN | 111353071 | A | 6/2020 |
| CN | 111652792 | A | 9/2020 |
| CN | 112199526 | A | 1/2021 |
| CN | 112989904 | A | 6/2021 |

OTHER PUBLICATIONS

International Search Report for International Patent Application No. PCT/CN2021/114947, mailed Oct. 28, 2021 (12 pages).

* cited by examiner

STYLED IMAGE GENERATION METHOD, MODEL TRAINING METHOD, APPARATUS, DEVICE, AND MEDIUM

This application is a 35 U.S.C. § 371 National Phase of International Patent Application No. PCT/CN2021/114947, titled "STYLED IMAGE GENERATION METHOD, MODEL TRAINING METHOD, APPARATUS, DEVICE, AND MEDIUM", filed on Aug. 27, 2021, which claims the priority to Chinese Patent Application No. 202011063185.2, titled "STYLED IMAGE GENERATION METHOD, MODEL TRAINING METHOD, APPARATUS, DEVICE, AND MEDIUM", filed on Sep. 30, 2020, both of which are incorporated herein by reference in their entireties.

FIELD

The present disclosure relates to the field of image processing technology, and in particular, to a styled-image generation method, a model training method, an apparatus, a device and a medium.

BACKGROUND

Currently, with the gradual enrichment of video interactive application functions, image style conversion is becoming a new fun. The image style conversion refers to performing style conversion for one or more images to generate styled-images that meet user needs.

In conventional technology, when the style of an image is converted, the effect of the converted image is often unsatisfactory. For face images, due to different photographing angles and the photographing methods, the composition and size vary for different original face images. Moreover, due to uneven level in training of models with styled-image generation function, effects of the different face images undergone style conversion by the trained models are unsatisfactory.

SUMMARY

In order to solve the above technical problems or at least partially solve the above technical problems, a styled-image generation method, model training method, apparatus, device and medium are provided in embodiments of the present disclosure.

In a first aspect, a styled-image generation method is provided in embodiments of the present disclosure, and the method includes:

- obtaining an original face image; and
- obtaining a target styled face image corresponding to the original face image, by using a pre-trained styled-image generation model;
- wherein the styled-image generation model is obtained by training with a plurality of original face sample images and a plurality of target styled face sample images, the plurality of target styled face sample images are generated by a pre-trained image generation model, and the image generation model is obtained by training with a plurality of pre-obtained standard styled face sample images.

In a second aspect, a method for training a styled-image generation model is further provided in embodiments of the present disclosure, and the method includes:

- obtaining a plurality of original face sample images;
- obtaining a plurality of standard styled face sample images;

- training an image generation model based on the plurality of standard styled face sample images to obtain a trained image generation model;
- generating a plurality of target styled face sample images by using the trained image generation model; and
- training a styled-image generation model by using the plurality of original face sample images and the plurality of target styled face sample images, to obtain a trained styled-image generation model.

In a third aspect, a styled-image generation apparatus is further provided in embodiments of the present disclosure, and the apparatus includes:

- an original image obtaining module, configured to obtain an original face image; and
- a styled-image generation module, configured to obtain a target styled face image corresponding to the original face image by using a pre-trained styled-image generation model;
- wherein the styled-image generation model is obtained by training with a plurality of original face sample images and a plurality of target styled face sample images, the plurality of target styled face sample images are generated by a pre-trained image generation model, and the image generation model is obtained by training with a plurality of pre-obtained standard styled face sample images.

In a forth aspect, an apparatus for training a styled-image generation model is further provided in embodiments of the present disclosure, and the apparatus includes:

- an original sample image obtaining module, configured to obtain a plurality of original face sample images;
- an image generation model training module, configured to obtain a plurality of standard styled face sample images, and to train an image generation model based on the plurality of standard styled face sample images to obtain a trained image generation model;
- a target styled sample image generation module, configured to generate a plurality of target styled face sample images by using the trained image generation model; and
- a styled-image generation model training module, configured to train a styled-image generation model by using the plurality of original face sample images and the plurality of target styled face sample images to obtain a trained styled-image generation model.

In a fifth aspect, an electronic device is further provided in embodiments of the present disclosure, and the device includes:

- a processor; and
- a memory for storing instructions executable by the processor;
- wherein the processor is used to read the executable instructions from the memory and execute the executable instructions to implement the styled-image generation method according to any one of the embodiments of the present disclosure, or to implement the method for training the styled-image generation model according to any one of the embodiments of the present disclosure.

In a sixth aspect, a computer-readable storage medium is further provided in embodiments of the present disclosure. The storage medium stores a computer program. When the computer program is executed by a processor, the styled-image generation method according to any one of the embodiments of the present disclosure is implemented, or the method for training the styled-image generation model according to any one of the embodiments of the present disclosure is implemented.

The technical solution provided by embodiments of the present disclosure has at least the following advantages as compared with the conventional technology: in the training process of the styled-image generation model, the image generation model is trained based on multiple standard styled face sample images to obtain the trained image generation model, and then multiple target styled face sample images are generated by using the trained image generation model, for usage in the training process of the styled-image generation model. The styled-image generation model is obtained by training with multiple target styled face sample images which are generated by the trained image generation model, which ensures the source uniformity, distribution uniformity, and style uniformity of sample data that meet the style requirements, constitutes high-quality sample data, and improves the training effect of the styled-image generation model. Furthermore, in the process of styled-image generation (or the application process of styled-image generation model), the pre-trained styled-image generation model is used to obtain the target styled face image corresponding to the original face image, which facilitates the generation of the target styled-image and solves the problem of poor image effect after image style conversion in the conventional technology.

BRIEF DESCRIPTION OF THE DRAWINGS

Drawings herein, which are incorporated in and constitute a part of this specification, illustrate embodiments consistent with the present disclosure and together with the description serve to explain the principles of the present disclosure.

In order to more clearly explain the embodiments of the present disclosure or the technical solutions in the conventional technology, the following will briefly introduce the drawings needed to be used in the embodiments of the present disclosure or description of the conventional technology. Obviously, for those skilled in the art, other drawings can be obtained from these drawings without any creative labor.

DETAILED DESCRIPTION

In order to more clearly understand the above objects, features and advantages of the present disclosure, the solutions of the present disclosure will be further described below. It should be noted that the embodiments of the present disclosure and features in the embodiments may be combined with each other if there is no conflict.

Many specific details are described in the following description to facilitate full understanding of the disclosure, and the disclosure can also be implemented in other ways different from those described herein. Obviously, the embodiments in the description are only a part of the embodiments of the present disclosure, rather than all of the embodiments.

Figure 1:
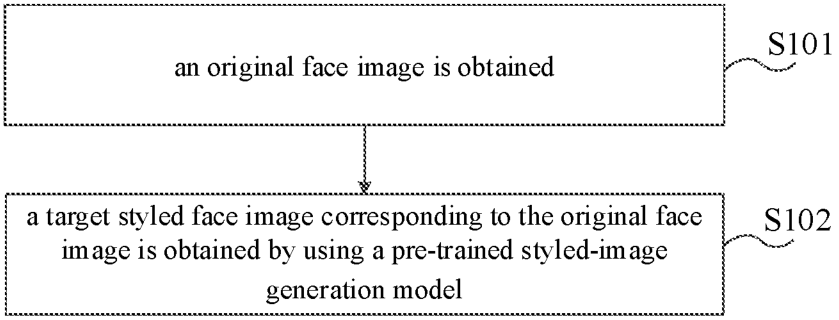
FIG. 1 is a flowchart of a styled-image generation method according to an embodiment of the present disclosure.

FIG. 1 is the flowchart of a styled-image generation method according to an embodiment of the present disclosure. The embodiments of the present disclosure may be applicable in the generation of any styled-image based on the original face image. The image style mentioned in the embodiments of the present disclosure may refer to image effects, such as Japanese comic style, European and American cartoon style, oil painting style, sketch style, or cartoon style, which may be determined according to the classification of image styles in the image processing field. The original face image may refer to any image including a face area.

The styled-image generation method according to embodiments of the present disclosure may be executed by a styled-image generation apparatus. The styled-image generation apparatus may be implemented in software and/or hardware, and may be integrated on any electronic device with computing function, such as a terminal, a server, etc. The terminal may include, but not limited to, an intelligent mobile terminal, a tablet computer, a personal computer, etc. In addition, the styled-image generation apparatus may be implemented in the form of an independent application program or an applet integrated on a public platform, and may alternatively be implemented as an application program with the styled-image generation function or a functional module integrated in the applet. The application program or applet may include, but not limited to, a video interactive application program or a video interactive applet.

As shown in FIG. 1, the styled-image generation method according to the embodiment of the present disclosure may include the following steps.

In step S101, an original face image is obtained.

As an example, when the user needs to generate a styled-image, the user may upload an image stored in the terminal or may capture an image or a video in real time with an image capturing device of the terminal. The terminal may obtain the original face image to be processed according to the user's image selection operation, image capture operation or image upload operation in the terminal.

In step S102, a target styled face image corresponding to the original face image is obtained by using a pre-trained styled-image generation model.

The styled-image generation model is obtained by training with multiple original face sample images and multiple target styled face sample images, the multiple target styled face sample images are generated by a pre-trained image generation model, and the image generation model is obtained by training with multiple pre-obtained standard styled face sample images.

The pre-trained styled-image generation model has the function of generating styled-images, which may be realized based on any available neural network model with image style conversion ability. As an example, the styled-image generation model may include any network model supporting non-aligned training, such as the Conditional Generic Adversary Network (CGAN) model, and the Cycle Consistent Adversary Network (Cycle GAN) model, etc. In the training process of styled-image generation model, the available neural network model may be flexibly selected as needed in the styled-image processing.

In the embodiment of the disclosure, the styled-image generation model is trained based on a face sample image set. The face sample image set includes multiple target styled face sample images with uniform source and uniform style and multiple original face sample images. The good quality of sample data ensures the training effect of the model, and in turn facilitates the generation of the target styled-image by using the trained styled-image generation model and solves the problem of poor image effect after image style conversion in the conventional technology.

The target styled face sample images are generated by a pre-trained image generation model. The pre-trained image generation model is obtained by training an image generation model with multiple standard styled face sample images. The available image generation models may include, but not limited to, the Generative Adversarial Network (GAN) model, the Style-Based Generator Architecture for Generative Adversarial Network (Stylegan) model, etc. The specific implementation principles may refer to conventional technology. The standard styled face sample images may be drawn for a preset number (determined according to the training needs) of original face sample images by professional painters according to current image style requirements.

Figure 2:
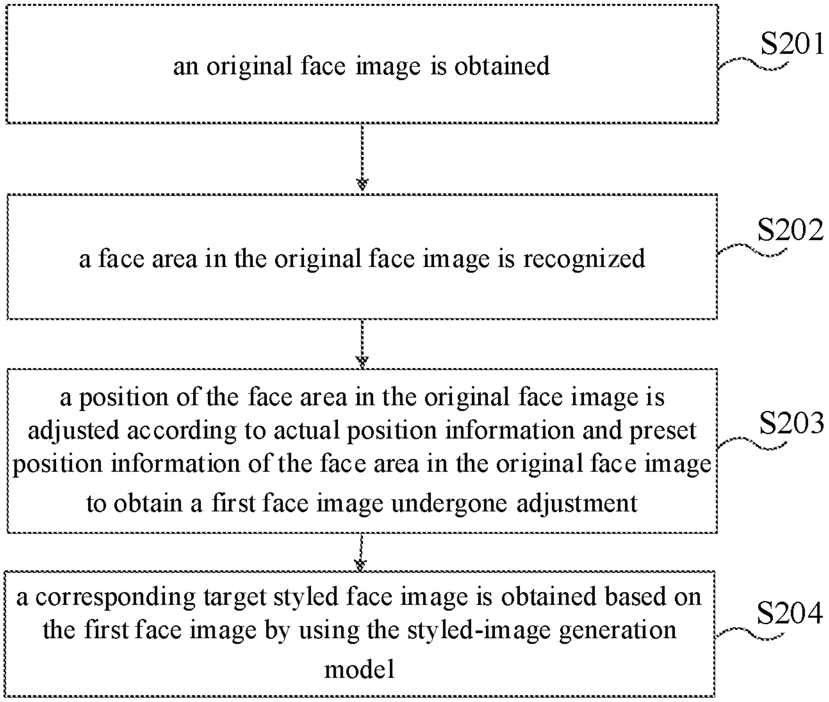
FIG. 2 is a flowchart of a styled-image generation method according to another embodiment of the present disclosure.

FIG. 2 is the flowchart of a styled-image generation method according to another embodiment of the present disclosure, which is further optimized and expanded based on the above technical solution, and may be combined with each of the above optional embodiments. As shown in FIG. 2, the styled-image generation method may include the following steps.

In step S201, an original face image is obtained.

In step S202, a face area in the original face image is recognized.

As an example, the terminal may use face recognition technology to recognize the face area on the original face image. The available face recognition technologies, such as the use of face recognition neural network model, may be implemented by referring to the principles of the conventional technology, and the embodiments of the present disclosure are not limited in this aspect.

In step S203, a position of the face area in the original face image is adjusted according to actual position information and preset position information of the face area in the original face image, to obtain a first face image undergone adjustment.

The actual position information is used to represent the actual position of the face area in the original face image. In the process of recognizing the face area in the original face image, the actual position of the face area in the image may be determined at the same time. For example, the actual position information of the face area in the original face image may be represented by the coordinates of the bounding box surrounding the face area in the original face image, or by the coordinates of the preset key points in the face area. The preset key points may include, but not limited to, feature points of facial contour and key points in facial feature area.

The preset position information is determined according to preset face position requirements, and is used to represent a target position of the face area to which the face area in the original face image is to be adjusted during the styled-image generation process. For example, the preset face position requirements may include: after the position of the face area is adjusted, the face area is located in the center of the whole image; or, after the position of the face area is adjusted, the facial feature area in the face area is at a specific position of the whole image; or, after the position of the face area is adjusted, the proportions of the face area and a background area (referring to the remaining image areas except the face area in the whole image) in the whole image meet a proportion requirement. By setting the proportion requirement, the phenomenon that the face area occupies too large or too small area in the whole image may be avoided, and the face area and the background area may be displayed in a balanced way.

The position adjustment of the face area may include, but not limited to, rotation, translation, reduction, enlargement and cropping. According to the actual position information and preset position information of the face area in the original face image, at least one position adjustment operation may be flexibly selected to adjust the position of the face area, until a face image that meets the preset face position requirements is obtained.

Figure 3:
FIG. 3 is a schematic diagram of an image after adjusting position of a face area in an original face image according to an embodiment of the present disclosure.

FIG. 3 is a schematic diagram of an image after adjusting position of a face area in an original face image according to an embodiment of the present disclosure, which is used to illustrate the display effect of the first face image in an embodiment of the present disclosure. As shown in FIG. 3, the two face images displayed in the first line are the original face images. By rotating and cropping the original face images, the first face images that meet the preset face position requirements, i.e., the face images displayed in the second line of FIG. 3, are obtained. Both of the first face images are in the face alignment state. The cropping size of the original face image may be determined according to the input image size of the trained styled-image generation model.

In the embodiment of the present disclosure, standardized pre-processing of the original face image is realized by adjusting the position of the face area in the original face image, which can ensure the subsequent generation effect of the styled-image.

Returning to FIG. 2, in step S204, a corresponding target styled face image is obtained based on the first face image by using the styled-image generation model.

According to the technical solution of the embodiments of the present disclosure, the standardized pre-processing of the original face image is realized by adjusting the position of the face area in the original face image to be processed during the generation of the styled-image, and then the corresponding target styled face image is obtained by using the pre-trained styled-image generation model, which improves the generation effect of the target styled-image, and solves the problem of poor image effect after image style conversion in the conventional technology.

On the basis of the above technical solutions, in an embodiment of the present disclosure, the step of adjusting the position of the face area in the original face image according to the actual position information and the preset position information of the face area in the original face image includes:

- obtaining actual positions of at least three target reference points in the face area, where the actual positions of the target reference points may be determined by face key point detection;
- obtaining preset positions of the at least three target reference points, where the preset position refers to the position of the target reference point on the face image (i.e. the first face image input to the trained styled-image generation model) for which the position of the face area has been adjusted;
- constructing a position adjustment matrix based on the actual positions of the at least three target reference points and the preset positions of the at least three target reference points, where the position adjustment matrix represents the transformation relationship between the actual positions and the preset positions of the target reference points, including the rotation relationship and/or translation relationship, which may be determined according to the coordinate transformation principle (also referred to as the affine transformation principle); and
- adjusting the position of the face area in the original face image based on the position adjustment matrix, to obtain the first face image undergone adjustment.

Considering that at least three target reference points can accurately determine the plane where the face area is located, in the embodiment of the present disclosure, the actual positions and preset positions of the at least three target reference points are used to determine the position adjustment matrix. The at least three target reference points can be any key points in the face area, such as feature points of face contour and/or key points of facial feature area.

In an embodiment, the at least three target reference points include a left eye area reference point, a right eye area reference point and a nose reference point. The left eye area reference point, the right eye area reference point and the nose reference point can be any key points of the left eye area, the right eye area and the nose in the face area respectively. Considering that the facial feature area in the face area is relatively stable, the key points of the facial feature area are taken as the target reference points. Compared with taking the feature points of facial contour as the target reference points, it can avoid the inaccurate determination of the position adjustment matrix caused by the deformation of the facial contour, and ensure the accuracy of the determination of the position adjustment matrix.

It is possible to set the preset positions of the at least three target reference points in advance. Alternatively, it is also possible to set the preset position of one target reference point in advance, and then determine the preset positions of the remaining at least two target reference points based on the geometric position relationship of the at least three target reference points in the face area. For example, the preset position of the nose reference point is set in advance, and then the preset positions of the left eye area reference point and the right eye area reference point are calculated based on the geometric position relationship between the left eye area and the nose and the geometric position relationship between the right eye area and the nose in the face area.

In addition, the key point detection technology in conventional technology may also be used to detect the key points of the original face image to obtain the actual positions of the at least three target reference points in the face area, such as the actual positions of the left eye area reference point, the right eye area reference point and the nose reference point.

Figure 4:
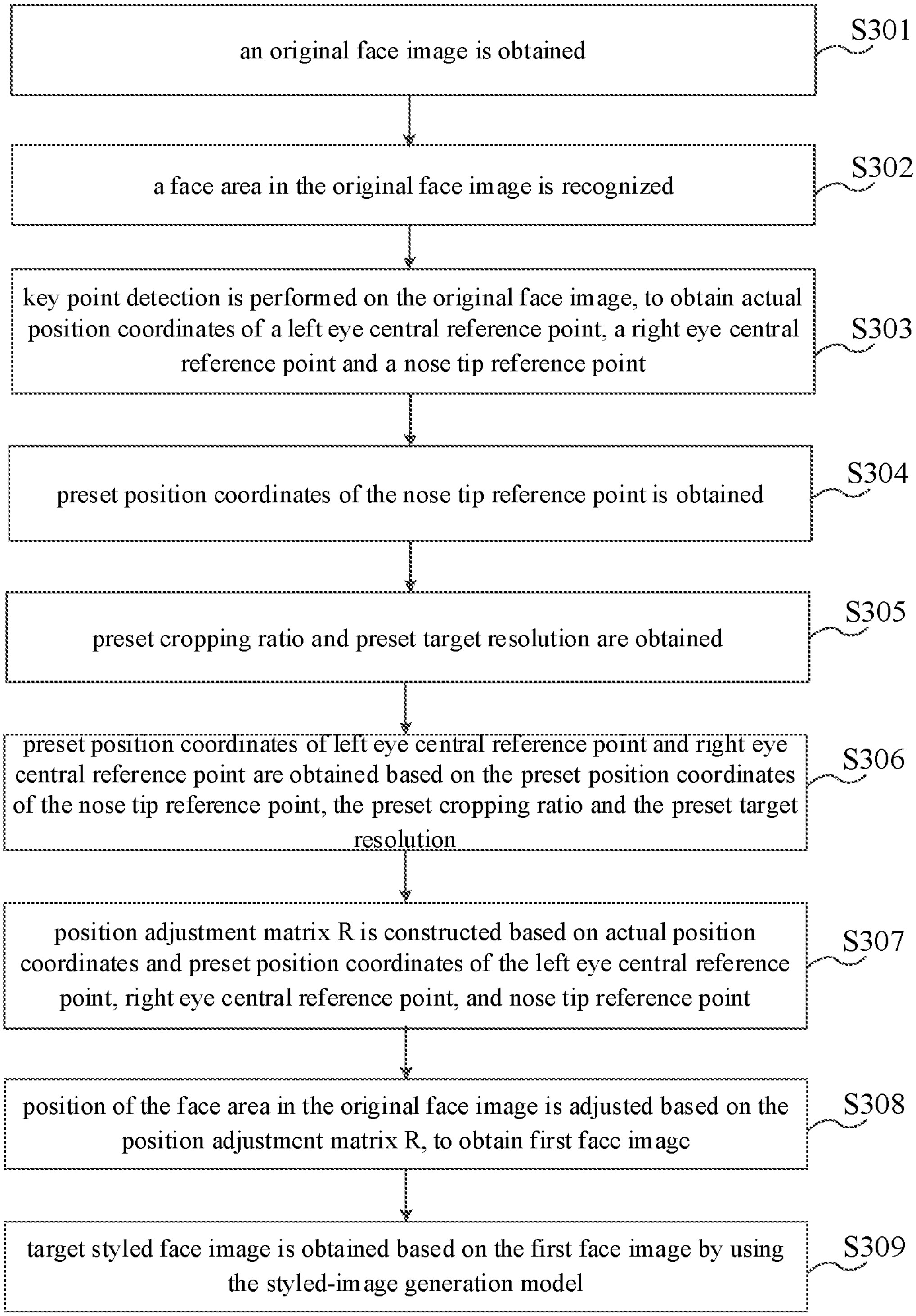
FIG. 4 is a flowchart of a styled-image generation method according to another embodiment of the present disclosure.

FIG. 4 is a flowchart of a styled-image generation method according to another embodiment of the present disclosure, which is further optimized and expanded based on the above technical solutions, and may be combined with each of the above optional embodiments. Specifically, taking the example in which the left eye area reference point includes the left eye central reference point, the right eye area reference point includes the right eye central reference point, and the nose reference point includes the nose tip reference point, the embodiments of the present disclosure is illustrated. The operations common in FIG. 4 and FIG. 2 are not repeated here and may be referred to the explanation of the above embodiments.

As shown in FIG. 4, the styled-image generation method may include the following steps.

In step S301, an original face image is obtained.

In step S302, a face area in the original face image is recognized.

In step S303, key point detection is performed on the original face image, to obtain actual position coordinates of a left eye central reference point, a right eye central reference point and a nose tip reference point.

In step S304, preset position coordinates of the nose tip reference point are obtained.

In an embodiment, the preset position coordinates of the nose tip reference point may be set in advance.

In step S305, preset cropping ratio and preset target resolution are obtained.

The preset cropping ratio may be determined according to the proportion of the face area to the whole image in the first face image to be input to the trained styled-image generation model. For example, if the face area in the first face image needs to occupy ⅓ of the whole image, the cropping ratio may be set to 3 times. The preset target resolution may be determined according to the image resolution requirements for the first face image, representing the number of pixels contained in the first face image.

In step S306, preset position coordinates of the left eye central reference point and preset position coordinates of the right eye central reference point are obtained based on the preset position coordinates of the nose tip reference point, the preset cropping ratio and the preset target resolution.

Since the cropping ratio is related to the proportion of the face area to the first face image, after the step of determining the target resolution of the first face image, the size of the face area in the first face image may be determined by combining the cropping ratio, and then the distance between two eyes may be determined by further combining the relationship between the distance between two eyes and the width of the face. If the cropping ratio is directly related to the proportion of the distance between two eyes to the size of the first face image, the distance between two eyes may be determined directly based on the cropping ratio and the target resolution. Then, based on the geometric position relationship between the center of the left eye and the tip of the nose and the geometric position relationship between the center of the right eye and the tip of the nose, for example, the midpoint of the line connecting between the centers of the two eyes is on a same vertical line with the tip of the nose, that is, the center of the left eye and the center of the right eye are symmetrical about the vertical line passing through the tip of the nose, the preset position coordinates of the left eye central reference point the and the right eye central reference point are determined by using the preset position coordinates of the nose tip reference point.

The determination of the preset position coordinates of the left eye central reference point and the right eye central reference point is illustrated by taking the example that the cropping ratio is directly related to the proportion of the distance between the two eyes to the size of the first face image. It is supposed that the upper left corner of the first face image is the image coordinate origin o, the vertical direction of the nose tip is the y-axis direction, the horizontal direction of the line connecting between centers of the two eyes is the x-axis direction, the preset position coordinates of the nose tip reference point are expressed as ($x_{nose}$, $y_{nose}$), and the preset position coordinates of the left eye central reference point are expressed as ($x_{eye\_l}$, $y_{eye\_l}$), the preset position coordinates of the right eye central reference point are expressed as ($x_{eye\_r}$, $y_{eye\_r}$), the distance between the midpoint of the line connecting centers of the two eyes and the nose tip reference point in the first face image is expressed as Den', and the nose tip reference point is on a same vertical line as the midpoint of the line between centers of two eyes, then the step of obtaining the preset position coordinates of the left eye central reference point and preset position coordinates of the right eye central reference point based on the preset position coordinates of the nose tip reference point, the preset cropping ratio and the preset target resolution may include the following steps:

- determining the distance between the left eye central reference point and the right eye central reference point in the first face image based on the preset cropping ratio a and the preset target resolution r; for example, it can be expressed by the following formula:

$$|x_{eye\_l}-x_{eye\_r}|=r/a;$$

- determining the preset abscissa of the left eye central reference point and the preset abscissa of the right eye central reference point based on the distance between the left eye central reference point and the right eye central reference point in the first face image; for example, it can be expressed by the following formula:

$$x_{eye\_l}=(½-½a)r;$$

$$x_{eye\_r}=(½+½a)r;$$

- where r/2 represents the abscissa of the center of the first face image;
- determining the distance Den' between the midpoint of the line connecting centers of two eyes and the nose tip reference point in the first face image, based on the distance between the left eye central reference point and the right eye central reference point of the first face image, the distance Deye between the left eye central reference point and the right eye central reference point in the original face image, and the distance Den between the midpoint of the line connecting centers of two eyes and the nose tip reference point in the original face image;
- where the distance Deye between the left eye central reference point and the right eye central reference point in the original face image and the distance Den between the midpoint of the line connecting centers of two eyes and the nose tip reference point in the original face image may be determined according to the actual position coordinates of the left eye central reference point, the right eye central reference point and the nose tip reference point; since the original face image and the first face image are scaled equally, Den'/Den=(r/a)/Deye, and then the distance between the midpoint of the line connecting centers of two eyes and the nose tip reference point in the first face image may be expressed as Den'=(Den·r)/(a·Deye);
- determining the preset ordinate of the left eye central reference point and the preset ordinate of the right eye central reference point based on the preset position coordinates of the nose tip reference point and the distance between the midpoint of the line connecting centers of two eyes and the nose tip reference point in the first face image; for example, it can be expressed by the following formula:

$$y_{eye\_l}=y_{eye\_r}=y_{nose}-Den'=y_{nose}-(Den\cdot r)/(a\cdot \mathrm{Deye});$$

and

- determining the preset position coordinates of the left eye central reference point and the right eye central reference point after the preset abscissas and the preset ordinates are determined.

It should be noted that the above description, as an example of the determination process of the preset position coordinates of the left eye central reference point and the right eye central reference point, should not be understood as a specific definition of the embodiments of the present disclosure.

After determining the actual position information and preset position information of the face area in the original face image, at least one or more operations such as rotation, translation, reduction, enlargement and cropping may be performed on the original face image as required, and the parameters corresponding to each operation may be determined. Then, combined with the known preset position coordinates of the target reference point and the geometric position relationship among the target reference points in the face area, the preset position coordinates of the remaining target reference points are determined.

Returning to FIG. 4, in step S307, the position adjustment matrix R is constructed based on the actual position coordinates and preset position coordinates of the left eye central reference point, the actual position coordinates and preset position coordinates of the right eye central reference point, and the actual position coordinates and preset position coordinates of the nose tip reference point.

In step S308, the position of the face area in the original face image is adjusted based on the position adjustment matrix R, to obtain the first face image undergone adjustment.

In the process of obtaining the first face image, the original face image needs to be translated and/or rotated according to the position adjustment matrix R, and the original face image needs to be cropped according to the preset cropping ratio.

In step S309, the corresponding target styled face image is obtained based on the first face image by using the styled-image generation model.

According to the technical solution of the embodiments of the present disclosure, by determining the actual position coordinates and preset position coordinates corresponding to the left eye central reference point, the right eye central reference point and the nose tip reference point in the original face image during the generation of the styled-image, the determination accuracy of the position adjustment matrix used to adjust the position of the face area in the original face image is ensured, and the processing effect of the standardized pre-processing on the original face image is improved, the generation effect of styled-image based on the trained styled-image generation model is improved, and the problem of poor image effect after image style conversion in conventional technology is solved.

Figure 5:
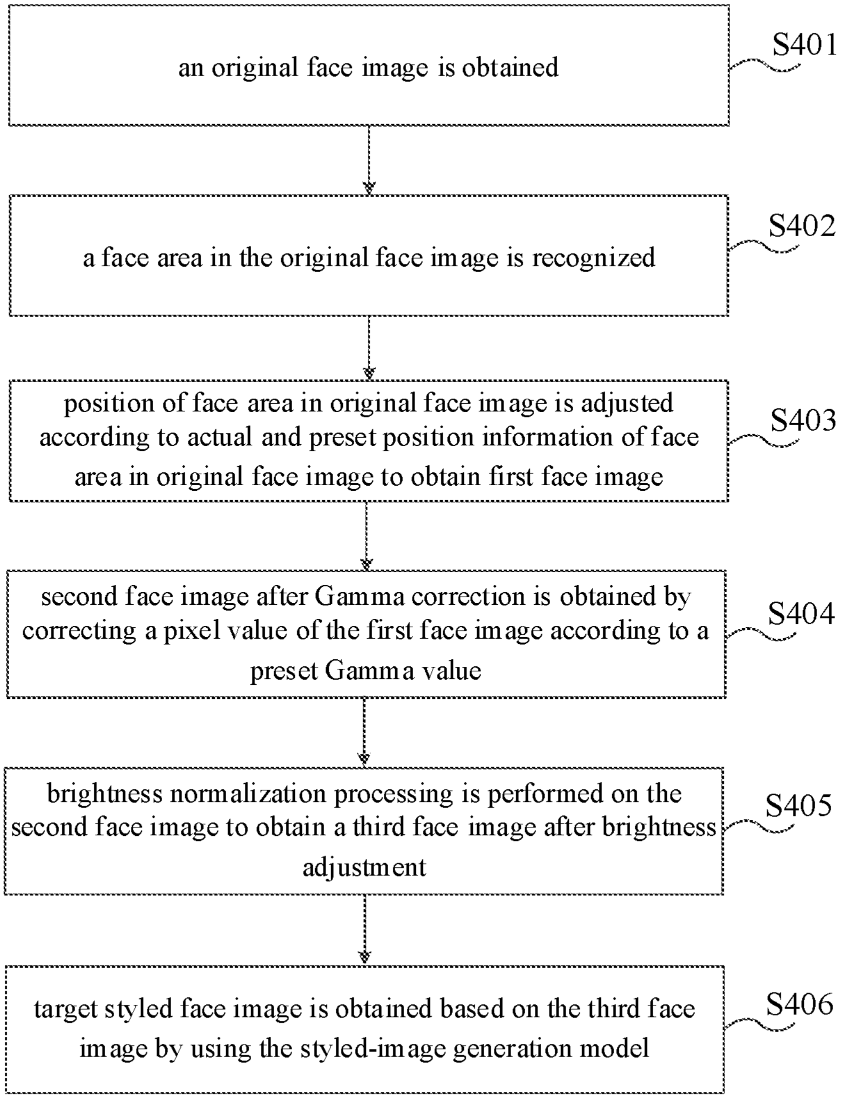
FIG. 5 is a flowchart of a styled-image generation method according to another embodiment of the present disclosure.

FIG. 5 is a flowchart of a styled-image generation method according to another embodiment of the present disclosure, which is further optimized and expanded based on the above technical solutions, and may be combined with each of the above optional embodiments. FIG. 5 has the same operation as FIG. 4 or FIG. 2 respectively, so it will not be repeated here. Please refer to the explanation of the above embodiments. The operations common in FIG. 5 and FIG. 4 or FIG. 2 are not repeated here and may be referred to the explanation of the above embodiments.

As shown in FIG. 5, the styled-image generation method may include the following steps.

In step S401, an original face image is obtained.

In step S402, a face area in the original face image is recognized.

In step S403, a position of the face area in the original face image is adjusted according to actual position information and preset position information of the face area in the original face image to obtain a first face image undergone adjustment.

In step S404, a second face image after Gamma correction is obtained by correcting a pixel value of the first face image according to a preset Gamma value.

Gamma correction may also be called Gamma nonlinearity or Gamma coding, which refers to nonlinear operation or inverse operation on brightness or tristimulus value of light in film or image system. Gamma correction for images may compensate the characteristics of vision, so as to maximize the use of data bits or bandwidth representing black and white according to human perception of light or black and white. The preset Gamma value may be set in advance, and the embodiments of the present disclosure are not specifically limited. For example, the pixel values of three RGB channels on the first face image are simultaneously corrected with a Gamma value of 1/1.5. The specific implementation of Gamma correction may refer to the principles of the conventional technology.

In step S405, brightness normalization is performed on the second face image to obtain a third face image after brightness adjustment.

For example, the maximum pixel value of the second face image after Gamma correction may be determined, and then all pixel values of the second face image after Gamma correction may be normalized to the currently determined maximum pixel value.

Through gamma correction and brightness normalization, the brightness distribution on the first face image can be more balanced, so as to avoid the phenomenon that the generated style image effect is not ideal due to the uneven brightness distribution of the image.

In step S406, the corresponding target styled face image is obtained based on the third face image by using the styled-image generation model.

According to the technical solution of the embodiments of the present disclosure, the standardized pre-processing of the original face image is realized by adjusting the position of the face area and performing Gamma correction and brightness normalization on the original face image to be processed during the generation of the styled-image, and the phenomenon that the generated styled-image is not ideal due to the uneven distribution of the image brightness is avoided, the generation effect of styled-image with the trained styled-image generation model is improved, and the problem of poor image effect after image style conversion in conventional technology is solved.

On the basis of the above technical solutions, in an embodiment, the step of performing brightness normalization on the second face image to obtain a third face image after brightness adjustment includes:

- extracting feature points of facial contour and key points of a target facial feature area based on the first face image or the second face image; where the extraction of the feature points of facial contour and the key points of the target facial feature area may be realized based on the conventional face key point extraction technology, and the embodiments of the present disclosure are not specifically limited;
- generating a full face mask image according to the feature points of facial contour, the full face mask image including a face area mask; that is, the full face mask image may be generated based on the first face image or the second face image;
- generating a local mask image according to the key points of the target facial feature area, the local mask image including an eye area mask and/or a mouth area mask in the face area; similarly, the local mask image may be generated based on the first face image or the second face image;
- subtracting a pixel value of the local mask image from a pixel value of the full face mask image to obtain an incomplete mask image; and
- fusing the first face image and the second face image based on the incomplete mask image to obtain the third face image after brightness adjustment.

As an example, the image area in the second face image except the facial feature area may be fused with the target facial feature area in the first face image according to the incomplete mask image to obtain the third face image after brightness adjustment.

Considering that the eye area and mouth area in the face area have specific colors inherent to the facial features, such as the eye pupil is black and the mouth is red, during the Gamma correction of the first face image, there is a phenomenon that the brightness of the eye area and mouth area is increased, which will cause the display area of the eye area and mouth area of the second face image after Gamma correction to become smaller, and the size of the display area is significantly different from that of the eye area and mouth area before brightness adjustment. Therefore, in order to avoid the distorted display of the facial feature area in the generated styled-image, the eye area and mouth area of the first face image may still be used as the eye area and mouth area of the third face image after brightness adjustment.

In specific applications, the local mask image covering at least one of the eye area and mouth area may be selected according to image processing requirements.

In an embodiment, the step of generating the local mask image according to the key points of the target facial feature area includes:

- generating a candidate local mask image according to the key points of the target facial feature area, the candidate local mask image including the eye area mask and/or the mouth area mask;
- performing Gaussian blur on the candidate local mask image; where the specific implementation of Gaussian blur may refer to the principles of the conventional technology, and the embodiments of the present disclosure are not specifically limited; and selecting, based on the candidate local mask image after the Gaussian blur, an area with a pixel value being greater than a preset threshold to generate the local mask image, where the preset threshold may be determined according to the pixel value of the mask image. For example, if the pixel value inside the selection area of the candidate local mask image is 255 (corresponding to white), the preset threshold may be set to 0 (corresponding to black), so that all non-black areas may be selected from the candidate local mask image after Gaussian blur. In other words, the minimum pixel value inside the selection area of the candidate local mask image may be determined, and then any pixel value less than the minimum pixel value may be set as the preset threshold value to determine a local mask image with expanded area based on the candidate local mask image after Gaussian blur.

For the candidate local mask image or local mask image, the selection area of the mask image refers to the eye area and/or mouth area of the face area. For the incomplete mask image, the selection area of the mask image refers to the remaining face area except the target facial feature area in the face area. For the full face mask image, the selection area of the mask image refers to the face area.

In the process of generating the local mask image, the area of the candidate local mask image may be expanded by performing Gaussian blur on the generated candidate local mask image. Then the final local mask image is determined based on the pixel value, which can avoid the phenomenon that the generated local mask area is smaller due to the smaller display area of the eye area and mouth area, which is caused by the increased brightness of the eye area and mouth area in the process of Gamma correction. If the generated local mask area is too small, the local mask area will not match the target facial feature area of the first face image before brightness adjustment, thus affecting the fusion of the first face image and the second face image. By performing Gaussian blur on the candidate local mask image, the area of the candidate local mask image can be expanded, thereby improving the fusion of the first face image and the second face image.

In an embodiment, after the step of subtracting the pixel value of the local mask image from the pixel value of the full face mask image to obtain the incomplete mask image, the method further includes:

performing Gaussian blur on the incomplete mask image.

By performing Gaussian blur on the incomplete mask image, the boundary of the incomplete mask image can be weakened, and the display of the boundary is not obvious, so as to optimize the display effect of the third face image after brightness adjustment.

Accordingly, the step of fusing the first face image and the second face image based on the incomplete mask image to obtain the third face image after brightness adjustment includes:

fusing the first face image and the second face image based on the incomplete mask image after Gaussian blur to obtain the third face image after brightness adjustment.

As an example, the pixel value distribution of the first face image is expressed as I, and the pixel value distribution of the second face image after Gamma correction is expressed as $I_g$. The pixel value distribution of the incomplete mask image after Gaussian blur is expressed as Mout (for the case where Gaussian blur is not performed, Mout may directly represent the pixel value distribution of the incomplete mask image), the pixel value inside the selection area of the mask image (the selection area refers to the remaining face area except the target facial feature area of the face area) is expressed as P, and the pixel value distribution of the third face image after brightness adjustment is expressed as $I_{out}$. The first face image and the second face image may be fused according to the following formula to obtain the third face image after brightness adjustment. The formula is as follows:

$$I_{out}=I_g\cdot(P-M\mathrm{out})+I\cdot M\mathrm{out};$$

where $I_g\cdot$(P−Mout) represents the image area of the second face image after removing the target facial feature area, I·Mout represents the facial feature area of the first face image, and $I_{out}$ represents the image area obtained by fusing the target facial feature area of the first face image into the image area of the second face image after removing the target facial feature area.

Taking the case that the pixel value P inside the selection area of the mask image equals to 1 as an example, the above formula can be expressed as:

$$I_{out}=I_g\cdot(1-M\mathrm{out})+I\cdot M\mathrm{out}.$$

Figure 6:
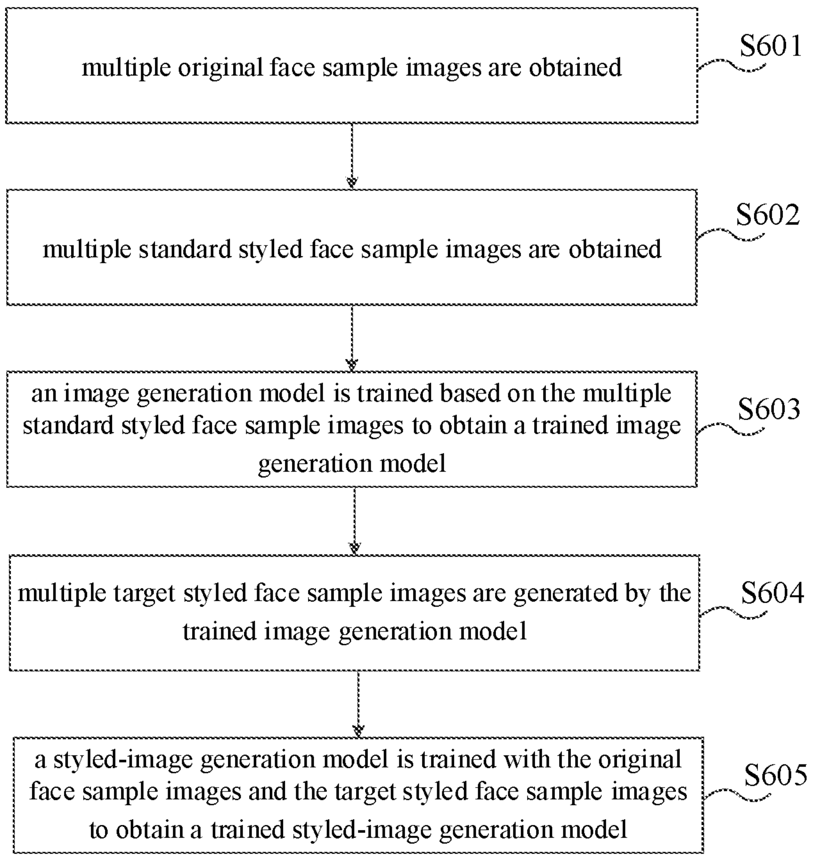
FIG. 6 is a flowchart of a method for training a styled-image generation model according to an embodiment of the present disclosure.

FIG. 6 is a flowchart of the method for training a styled-image generation model according to embodiments of the present disclosure. The embodiments of the present disclosure may be applied to train the styled-image generation model, and the trained styled-image generation model is used to generate the styled-image corresponding to the original face image. The image style mentioned in the embodiments of the present disclosure may refer to an image effect, such as Japanese comic style, European and American cartoon style, oil painting style, sketch style, or cartoon style, which may be determined according to the classification of image styles in the image processing field. The apparatus for training the styled-image generation model according to embodiments of the present disclosure may be implemented in software and/or hardware, and may be integrated on any electronic device with computing capability, such as a terminal, a server, and the like.

In the method of training the styled-image generation model and the styled-image generation method according to embodiments of the present disclosure, the processing of the original face image belongs to the same inventive concept except that the image processing objects are different. For the content not described in detail in the following embodiments, reference can be made to the description of the above embodiments.

As shown in FIG. 6, the method for training the styled-image generation model according to an embodiment of the present disclosure may include the following steps.

In step S601, multiple original face sample images are obtained.

In step S602, multiple standard styled face sample images are obtained.

The standard styled face sample images may be drawn for a preset number (determined according to the training needs) of original face sample images by professional painters according to current image style requirements. The embodiments of the present disclosure do not specifically limit this. The number of standard styled face sample images may be determined according to training needs, and the fineness and style of each standard style face sample image are consistent.

In step S603, an image generation model is trained based on the multiple standard styled face sample images to obtain a trained image generation model.

The image generation model may include the Generic Adversary Network (GAN) model, and the Style-Based Generator Architecture for Generative Adversarial Network (Stylegan) model, etc. The specific implementation principle may refer to the conventional technology. The image generation model of the embodiment of the present disclosure is trained by using multiple standard styled face image samples according to the desired image style, and generates sample data corresponding to the desired image style after training, such as generating the target styled face sample image. By using standard styled face sample images to train the image generation model, the accuracy of the model training is ensured, thus the generation effect of the sample images generated by the image generation model is ensured, so as to build high-quality and evenly distributed sample data.

In step S604, multiple target styled face sample images are generated with the trained image generation model.

As an example, by controlling the parameter values related to image features in the image generation model, the trained image generation model may be used to obtain the target styled face sample image that meets the image style requirements.

In an embodiment, the image generation model includes a GAN model, and the step of generating multiple target styled face sample images with the trained image generation model includes:

- obtaining a random feature vector used for generating a target styled face sample image set, the random feature vector being used to generate images with different features; and
- inputting the random feature vector into a trained GAN model to generate the target styled face sample image set, the target styled face sample image set including multiple target styled face sample images meeting image distribution requirements.

The image distribution requirements may be determined according to the construction requirements of the sample data. For example, the generated target styled face sample images cover a variety of image feature types, and the images belonging to different feature types are evenly distributed to ensure the comprehensiveness of the sample data.

Further, the step of inputting the random feature vector into the trained GAN model to generate the target styled face sample image set includes:

- obtaining an element of the random feature vector associated with an image feature of the target styled face sample image set to be generated, the image feature including at least one of light, face orientation, hair color and other features, and the diversity of the image feature ensuring the comprehensiveness of sample data; and
- controlling a value of the element associated with the image feature (i.e. adjusting the specific value of the elements associated with image feature) according to the image distribution requirements, and inputting the random feature vector with the value of the element being controlled into the trained GAN model to generate the target styled face sample image set.

By generating the target styled face sample image set based on the random feature vector and using the GAN model trained by the standard styled face sample image set, the convenience of sample data construction is realized, and the unity of image style is ensured. In addition, the target styled face sample image set includes a large number of sample images with uniform feature distribution, and thus the styled-image generation model may be trained based on high-quality sample data.

In step S605, a trained styled-image generation model is obtained by training with the multiple original face sample images and the multiple target styled face sample images.

The trained styled-image generation model has the function of generating styled-images, and may be implemented based on any available neural network model with image style conversion capability. As an example, the styled-image generation model may include any network model supporting non-aligned training, such as the Conditional Generic Adversary Network (CGAN) model, and the Cycle Consistent Adversary Network (Cycle GAN) model, etc. In the training process of styled-image generation model, the available neural network model may be flexibly selected according to the needs of the styled-image process.

According to the technical solutions of the embodiments of the present disclosure, during the training of the styled-image generation model, the image generation model is trained based on multiple standard styled face sample images to obtain the trained image generation model, and then multiple target styled face sample images are generated by using the trained image generation model; where the e target styled face sample images are to be used for the training of the styled-image generation model, thus, the source uniformity, distribution uniformity and style uniformity of sample data that meet the style requirements are ensured, high-quality sample data is built, the training effect of the styled-image generation model is improved, the generation effect of styled-images in the model application stage is further improved, and the problem of poor image effect after image style conversion in conventional technology is solved.

Figure 7:
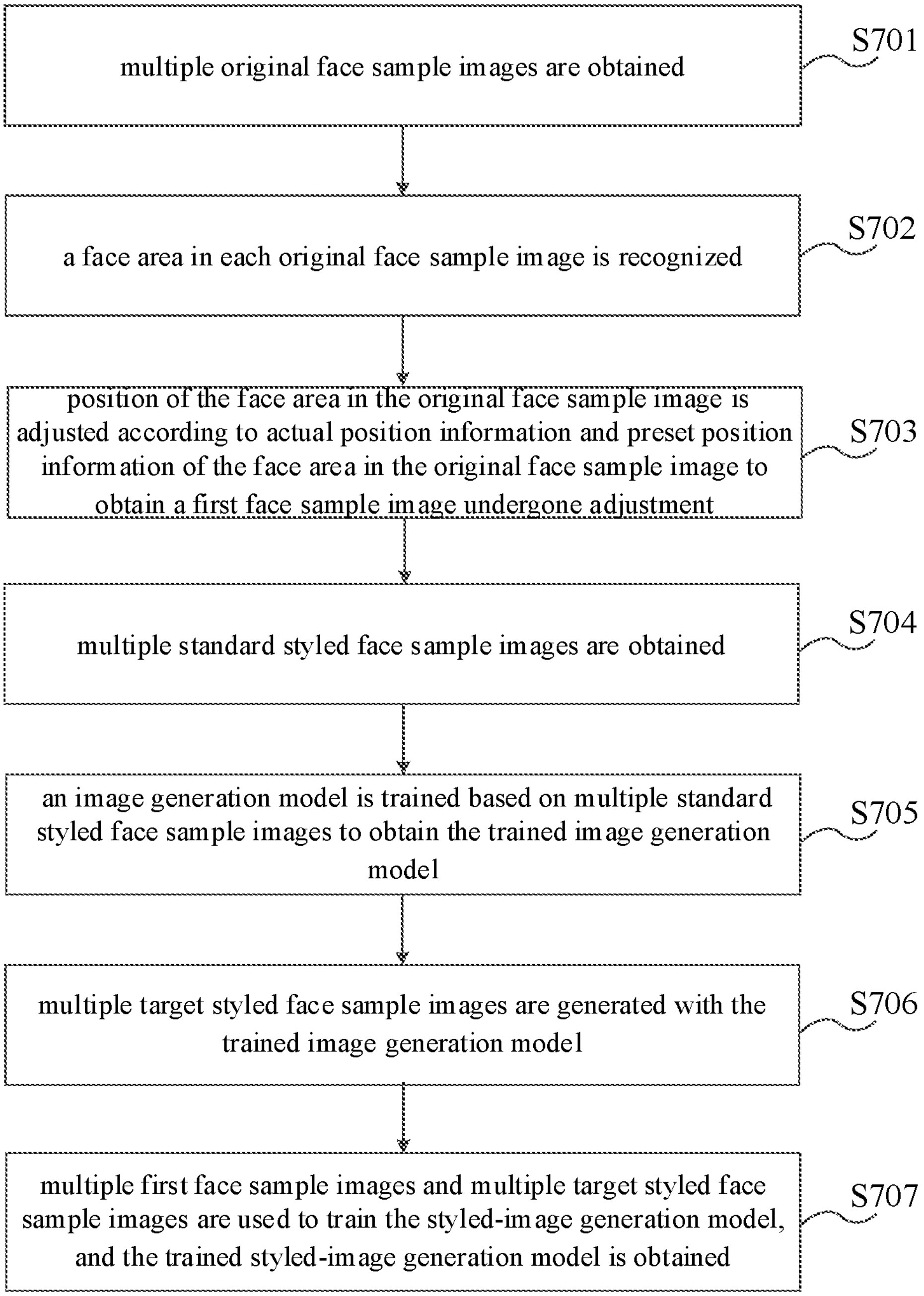
FIG. 7 is a flowchart of a method for training a styled-image generation model according to another embodiment of the present disclosure.

FIG. 7 is a flowchart of a method for training a styled-image generation model according to another embodiment of the present disclosure, which may be further optimized and expanded based on the above technical solutions, and may be combined with each of the above optional embodiments. As shown in FIG. 7, the method for training the styled-image generation model may include the following steps.

In step S701, multiple original face sample images are obtained.

In step S702, a face area in each of the original face sample images is recognized.

The terminal or server may use face recognition technology to recognize the face area in the original face sample image. The available face recognition technologies, such as the use of face recognition neural network model, may be implemented by referring to the principles of the conventional technology, and the embodiments of the present disclosure are not specifically limited.

In step S703, a position of the face area in the original face sample image is adjusted according to actual position information and preset position information of the face area in the original face sample image to obtain a first face sample image undergone adjustment.

The actual position information is used to represent the actual position of the face area in the original face sample image. In the process of recognizing the face area in the original face sample image, the actual position of the face area in the image may be determined at the same time. For example, the actual position information of the face area in the original face sample image may be represented by the image coordinates of the bounding box surrounding the face area in the original face sample image, or by the image coordinates of the preset key points in the face area. The preset key points may include, but not limited to, feature points of facial contour and key points in facial feature area.

The preset position information is determined according to the preset face position requirements, and is used to represent a target position of the face area to which the face area in the original face sample image is to be adjusted during training of styled-image generation model. For example, the preset face position requirements may include: after the face area position is adjusted, the face area is located in the center of the whole image; or, after the position of the face area is adjusted, the facial feature area of the face area is at a specific position of the whole image; or, after the position of the face area is adjusted, the proportions of the face area and the background area (referring to the remaining image areas except the face area in the whole image) in the whole image meet the proportion requirement. By setting the proportion requirement, the phenomenon that the face area occupies too large or too small area in the whole image may be avoided, and the face area and the background area may be displayed in a balanced way, so as to build high-quality training samples.

The position adjustment of the face area may include, but not limited to, rotation, translation, reduction, enlargement and cropping. According to the actual position information and preset position information of the face area in the original face sample image, at least one position adjustment operation may be flexibly selected to adjust the position of the face area, until a face image that meets the requirements of the preset face position is obtained.

For the display effect of the adjusted first face sample image, the image effect shown in FIG. 3 may be referred to analogically. As an analogy, as shown in FIG. 3, the two face images displayed in the first line are the original face sample images. By rotating and cropping the original face sample images, the first face sample images that meet the preset face position requirements, i.e., the face images displayed in the second line of FIG. 3, are obtained. Both of the first face sample images are in the face alignment state. The cropping size of the original face sample image may be determined according to the input image size of the trained styled-image generation model.

In step S704, multiple standard styled face sample images are obtained.

The standard styles face sample images may be drawn for a preset number (determined according to the training needs) of original face sample images or first face sample images by professional painters according to current image style requirements. The embodiments of the present disclosure do not specifically limit this. The number of standard styled face sample images may be determined according to training needs, and the fineness and style of each standard styled face sample image are consistent.

In step S705, an image generation model is trained based on multiple standard styled face sample images to obtain the trained image generation model.

In step S706, multiple target styled face sample images are generated with the trained image generation model.

In step S707, multiple first face sample images and multiple target styled face sample images are used to train the styled-image generation model, and the trained styled-image generation model is obtained.

It should be noted that there is no strict restriction on the execution order between the step S703 and the step S704, and the execution order shown in FIG. 7 should not be understood as a specific restriction on the embodiments of the present disclosure. In an embodiment, after obtaining the adjusted first face sample image, multiple standard styled face sample images may be drawn by professional painters based on the first face sample image, making multiple standard style face sample images more consistent with the current training requirements for image generation models.

In the technical solutions of the embodiments of the present disclosure, during the training of the styled-image generation model, according to the actual position information and preset position information of the face area in the original face sample image, the position of the face area in the original face sample image is adjusted to obtain the first face sample image that meets face position requirement, and then multiple target styled face sample images are generated by using the trained image generation model, which is also used in the training process of the styled-image generation model together with the original face sample image set, thereby improving the training effect of the model, further improving the styled-image generation effect in the model application stage, and solving the problem of poor image effect after image style conversion in the conventional technology. Moreover, in the embodiments of the present disclosure, there is no restriction on the brightness of the original face sample images and the target styled face sample images participating in the model training. The randomness of the image brightness distribution on each image ensures that the trained styled-image generation model can be applied to images with arbitrary brightness distribution, making the styled-image generation model highly robust.

In an embodiment, the step of adjusting the position of the face area in the original face sample image according to the actual position information and the preset position information of the face area in the original face sample image includes:

- obtaining actual positions of at least three target reference points in the face area;
- obtaining preset positions of the at least three target reference points, where the preset position refers to the position of the target reference point on the face image (i.e. the first face sample image input to the trained styled-image generation model) for which the position of the face area has been adjusted;
- constructing a position adjustment matrix based on the actual positions of the at least three target reference points and the preset positions of the at least three target reference points, where the position adjustment matrix represents the transformation relationship between the actual positions and the preset positions of the target reference points, including the rotation relationship and/or translation relationship, which may be determined according to the coordinate transformation principle (also referred to as the affine transformation principle); and
- adjusting the position of the face area in the original face sample image based on the position adjustment matrix, to obtain the first face sample image undergone adjustment.

Considering that at least three target reference points can accurately determine the plane where the face area is located, in the embodiment of the present disclosure, the actual positions and preset positions of the at least three target reference points are used to determine the position adjustment matrix. The at least three target reference points can be any key points in the face area, such as feature points of face contour and/or key points of facial feature area.

In an embodiment, at least three target reference points include a left eye area reference point, a right eye area reference point and a nose reference point. The left eye area reference point, the right eye area reference point and the nose reference point can be any key points of the left eye area, the right eye area and the nose in the face area respectively. Considering that the facial feature area in the face area is relatively stable, the key points of the facial feature area are taken as the target reference points. Compared with taking the feature points of facial contour as the target reference points, it can avoid the inaccurate determination of the position adjustment matrix caused by the deformation of the facial contour, and ensure the accuracy of the determination of the position adjustment matrix.

It is possible to set the preset positions of the at least three target reference points in advance. Alternatively, it is also possible to set the preset position of one target reference point in advance, and then determine the preset positions of the remaining at least two target reference points based on the geometric position relationship of the at least three target reference points in the face area. For example, the preset position of the nose reference point is set in advance, and then the preset positions of the left eye area reference point and the right eye area reference point are calculated based on the geometric position relationship between It is possible to set the preset positions of the at least three target reference points in advance. Alternatively, it is also possible to set the preset position of one target reference point in advance, and then determine the preset positions of the remaining at least two target reference points based on the geometric position relationship of the at least three target reference points in the face area.

In addition, the key point detection technology in conventional technology may also be used to detect the key points of the original face sample image to obtain the actual positions of the at least three target reference points in the face area, such as the actual positions of the left eye area reference point, the right eye area reference point and the nose reference point.

Figure 8:
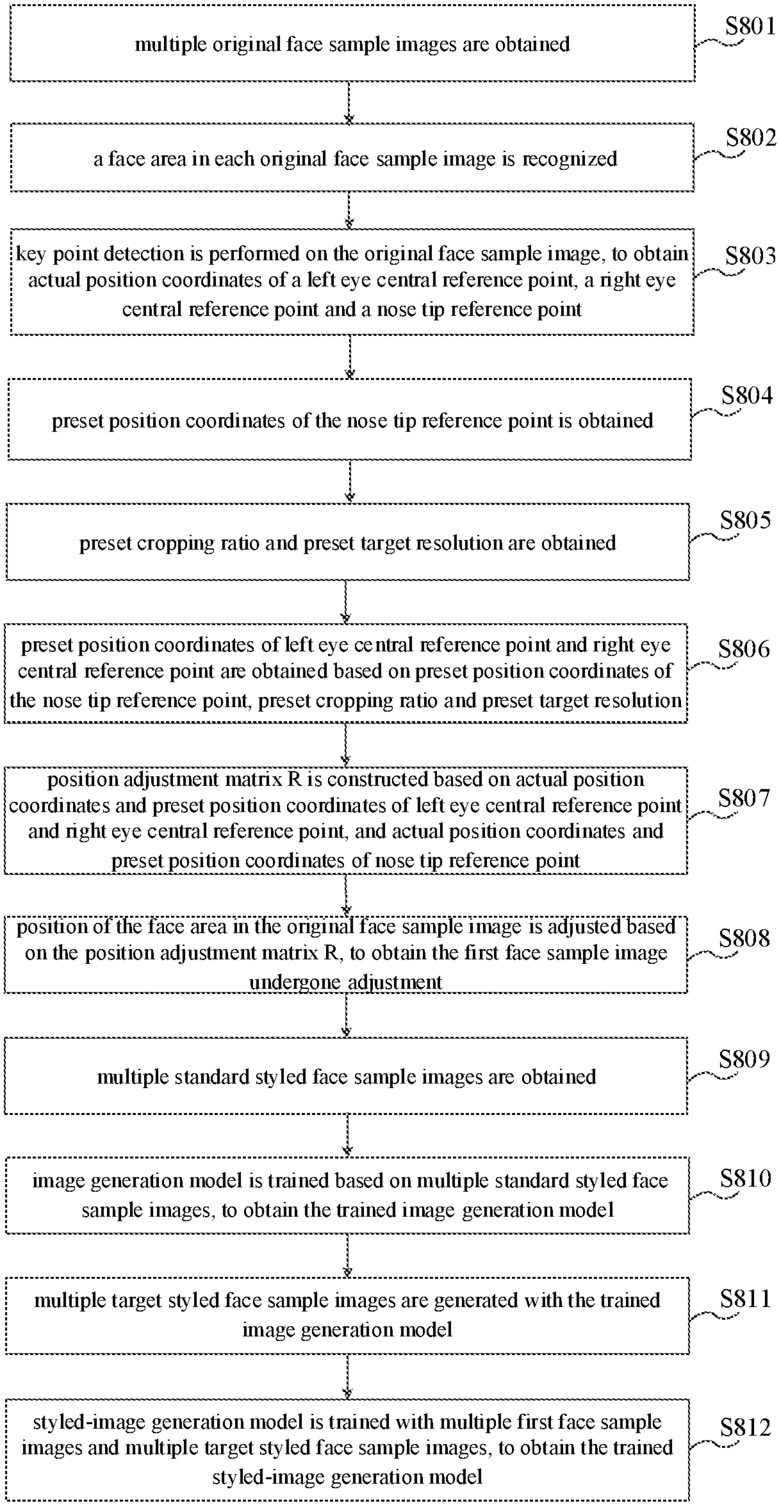
FIG. 8 is a flowchart of a method for training a styled-image generation model according to another embodiment of the present disclosure.

FIG. 8 is a flowchart of a method for training a styled-image generation model according to another embodiment of the present disclosure, which may be further optimized and expanded based on the above technical solutions, and may be combined with each of the above optional embodiments. Specifically, taking the example that the left eye area reference point includes the left eye central reference point, the right eye area reference point includes the right eye central reference point, and the nose reference point includes the nose tip reference point, the embodiments of the present disclosure will be illustrated. As shown in FIG. 8, the method for training the styled-image generation model may include the following steps.

In step S801, multiple original face sample images are obtained.

In step S802, a face area in each original face sample image is recognized.

In step S803, key point detection is performed on the original face sample image, to obtain actual position coordinates of a left eye central reference point, a right eye central reference point and a nose tip reference point.

In step S804, preset position coordinates of the nose tip reference point is obtained.

In an embodiment, the preset position coordinates of the nose tip reference point may be set in advance.

In step S805, preset cropping ratio and preset target resolution are obtained.

The preset cropping ratio may be determined according to the proportion of the face area to the whole image in the first face sample image used for model training. For example, if the size of the face area in the first face sample image needs to occupy ⅓ of the whole image, the cropping ratio may be set to 3 times. The preset target resolution may be determined according to the image resolution requirements of the first face sample image, representing the number of pixels contained in the first face sample image.

In step S806, preset position coordinates of the left eye central reference point and preset position coordinates of the right eye central reference point are obtained based on the preset position coordinates of the nose tip reference point, the preset cropping ratio and the preset target resolution.

Since the cropping ratio is related to the proportion of the face area to the first face sample image, after the step of determining the target resolution of the first face sample image, the size of the face area in the first face sample image may be determined by combining the cropping ratio, and then the distance between two eyes may be determined by further combining the relationship between the distance between two eyes and the width of the face. If the cropping ratio is directly related to the proportion of the distance between two eyes to the first face sample image, the distance between two eyes may be determined directly based on the cropping ratio and the target resolution. Then, based on the geometric position relationship between the center of the left eye and the tip of the nose and the geometric position relationship between the center of the right eye and the tip of the nose, for example, the midpoint of the line connecting centers of the two eyes is on a same vertical line with the tip of the nose, that is, the center of the left eye and the center of the right eye are symmetrical about the vertical line passing through the tip of the nose, and the preset position coordinates of the left eye central reference point and the right eye central reference point are determined by using the preset position coordinates of the nose tip reference point.

The determination of the preset position coordinates of the left eye central reference point and the right eye central reference point is illustrated by taking the example that the cropping ratio is directly related to the proportion of the distance between the two eyes to the size of the first face sample image. It is supposed that the upper left corner of the first face sample image is the image coordinate origin o, the vertical direction of the nose tip is the y-axis direction, the horizontal direction of the line connecting between centers of the two eyes is the x-axis direction, the preset position coordinates of the nose tip reference point are expressed as $(x_{nose}, y_{nose})$, and the preset position coordinates of the left eye central reference point are expressed as $(x_{eye\_l}, y_{eye\_l})$, the preset position coordinates of the right eye central reference point are expressed as $(x_{eye\_r}, y_{eye\_r})$, the distance between the midpoint of the line connecting centers of the two eyes and the nose tip reference point in the first face image is expressed as Den', and the nose tip reference point is on a same vertical line as the midpoint of the line between centers of two eyes, then the step of obtaining the preset position coordinates of the left eye central reference point and preset position coordinates of the right eye central reference point based on the preset position coordinates of the nose tip reference point, the preset cropping ratio and the preset target resolution may include the following steps:

- determining the distance between the left eye central reference point and the right eye central reference point in the first face image based on the preset cropping ratio a and the preset target resolution r; for example, it can be expressed by the following formula:

$$|x_{eye\_l}-x_{eye\_r}|=r/a;$$

- determining the preset abscissa of the left eye central reference point and the preset abscissa of the right eye central reference point based on the distance between the left eye central reference point and the right eye central reference point in the first face sample image; for example, it can be expressed by the following formula:

$$x_{eye\_l}=(\frac{1}{2}-\frac{1}{2}a)r;$$

$$x_{eye\_r}=(\frac{1}{2}+\frac{1}{2}a)r;$$

where r/2 represents the abscissa of the center of the first face sample image;

determining the distance Den' between the midpoint of the line connecting centers of two eyes and the nose tip reference point in the first face sample image, based on the distance between the left eye central reference point and the right eye central reference point of the first face sample image, the distance Deye between the left eye central reference point and the right eye central reference point in the original face sample image, and the distance Den between the midpoint of the line connecting centers of two eyes and the nose tip reference point in the original face sample image;

where the distance Deye between the left eye central reference point and the right eye central reference point in the original face sample image and the distance Den between the midpoint of the line connecting centers of two eyes and the nose tip reference point in the original face sample image may be determined according to the actual position coordinates of the left eye central reference point, the right eye central reference point and the nose tip reference point; since the original face sample image and the first face sample image are scaled equally, Den'/Den=(r/a)/Deye, and then the distance between the midpoint of the line connecting centers of two eyes and the nose tip reference point in the first face sample image may be expressed as Den'=(Den·r)/(a·Deye);

determining the preset ordinate of the left eye central reference point and the preset ordinate of the right eye central reference point based on the preset position coordinates of the nose tip reference point and the distance between the midpoint of the line connecting centers of two eyes and the nose tip reference point in the first face sample image; for example, it can be expressed by the following formula:

$$y_{eye\_l}=y_{eye\_r}=y_{nose}-Den'=y_{nose}-(Den\cdot r)/(a\cdot \mathrm{Deye});$$

and determining the preset position coordinates of the left eye central reference point and the right eye central reference point after the preset abscissas and the preset ordinates are determined.

It should be noted that the above description, as an example of the determination process of the preset position coordinates of the left eye central reference point and the right eye central reference point, should not be understood as a specific definition of the embodiments of the present disclosure.

After determining the actual position information and preset position information of the face area in the original face sample image, at least one or more operations such as rotation, translation, reduction, enlargement and cropping may be performed on the original face sample image as required, and the parameters corresponding to each operation may be determined. Then, combined with the known preset position coordinates of the target reference point and the geometric position relationship among the target reference points in the face area, the preset position coordinates of the remaining target reference points are determined.

Returning to FIG. 8, in step S807, the position adjustment matrix R is constructed based on the actual position coordinates and preset position coordinates of the left eye central reference point, the actual position coordinates and preset position coordinates of the right eye central reference point, and the actual position coordinates and preset position coordinates of the nose tip reference point.

In step S808, the position of the face area in the original face sample image is adjusted based on the position adjustment matrix R, to obtain the first face sample image undergone adjustment.

In the process of obtaining the first face sample image, the original face sample image needs to be translated and/or rotated according to the position adjustment matrix R, and the original face sample image needs to be cropped according to the preset cropping ratio.

In step S809, multiple standard styled face sample images are obtained.

For example, the multiple standard styled face sample images may be drawn for a preset number of original face sample images or first face sample images (determined according to the training needs) by professional painters according to current image style requirements. The embodiments of the present disclosure do not specifically limit this. The number of standard styled face sample images may be determined according to training needs, and the fineness and style of each standard style face sample image are consistent.

In step S810, the image generation model is trained based on multiple standard styled face sample images, to obtain the trained image generation model.

In step S811, multiple target styled face sample images are generated with the trained image generation model.

In step S812, the styled-image generation model is trained with multiple first face sample images and multiple target styled face sample images, to obtain the trained styled-image generation model.

It should be noted that there is no strict restriction on the execution order between the step S808 and the step S809, and the execution order shown in FIG. 8 should not be understood as a specific restriction on the embodiments of the disclosure. In an embodiment, after obtaining the adjusted first face sample image, multiple standard styled face sample images may be drawn by professional painters based on the first face sample image, making multiple standard styled face sample images more consistent with the current training requirements for image generation models.

In the technical solutions of the embodiments of the present disclosure, by determining the actual position coordinates and preset position coordinates corresponding to the left eye central reference point, the right eye central reference point and the nose tip reference point on the original face sample image during the training of the styled-image generation model, the determination accuracy of the position adjustment matrix used to adjust the position of the face area in the original face sample image is ensured, and the effect of the standardized preprocessing of the original face sample image is ensured. The high-quality sample data of face alignment is constructed and used in the training process of the styled-image generation model, which improves the training effect of the model, thereby improving the generation effect of the target styled-image, and solving the problem of poor image effect after image style conversion in the conventional technology.

On the basis of the above technical solutions, in an embodiment, after obtaining the first face sample image by adjusting the position of the face area in the original face sample image based on the position adjustment matrix, the training method according to the embodiments of the present disclosure may further include:

correcting a pixel value of the first face sample image according to a preset Gamma value to obtain a second face sample image after Gamma correction; and performing brightness normalization on the second face sample image to obtain a third face sample image after brightness adjustment.

In an embodiment, obtaining multiple standard styled face sample images includes: obtaining multiple standard styled face sample images based on the third face sample image. For example, professional painters may draw styled-images for a preset number of the third face sample images according to the current image style requirements to obtain standard styled face sample images.

Through Gamma correction and brightness normalization, the brightness distribution of the first face sample image is more balanced, and the training accuracy of the styled-image generation model is improved.

In an embodiment, the step of performing brightness normalization on the second face sample image to obtain the third face sample image after brightness adjustment includes:

extracting the feature points of facial contour and key points of the target facial feature area based on the first face sample image or the second face sample image;

generating the full face mask image according to the feature points of facial contour; that is, the full face mask image may be generated based on the first face sample image or the second face sample image;

generating the local mask image according to the key points of the target facial feature area, the local mask image including an eye area mask and/or a mouth area mask of the face area; similarly, the local mask image may be generated based on the first face sample image or the second face sample image;

subtracting a pixel value of the local mask image from a pixel value of the full face mask image to obtain an incomplete mask image; and fusing the first face sample image and the second face sample image based on the incomplete mask image to obtain the third face sample image after brightness adjustment, so as to train the styled-image generation mode based on multiple third face sample images and multiple target styled face sample images.

As an example, the image area in the second face sample image except the facial feature area may be fused with the target facial feature area in the first face sample image according to the incomplete mask image to obtain the third face sample image after brightness adjustment.

Considering that the eye area and mouth area in the face area have specific colors inherent to the facial features, such as the eye pupil is black and the mouth is red, during the Gamma correction of the first face sample image, there is a phenomenon that the brightness of the eye area and mouth area is increased, which will cause the display area of the eye area and mouth area of the second face sample image after Gamma correction to become smaller, and the size of the display area is significantly different from that of the eye area and mouth area before brightness adjustment. Therefore, in order to avoid the distorted display of the facial feature area in the generated styled-image, the eye area and mouth area of the first face sample image may still be used as the eye area and mouth area of the third face sample image after brightness adjustment.

In specific applications, the local mask image covering at least one of the eye area and mouth area may be selected according to image processing requirements.

In an embodiment, the step of generating the local mask image according to the key points of the target facial feature area includes:

generating a candidate local mask image according to the key points of the target facial feature area, the candidate local mask image including the eye area mask and/or the mouth area mask;

performing Gaussian blur on the candidate local mask image; and selecting, based on the candidate local mask image after the Gaussian blur, an area with a pixel value being greater than a preset threshold to generate the local mask image.

At this time, the area of the candidate local mask image may be expanded by performing Gaussian blur on the candidate local mask image. Then the final local mask image is determined based on the pixel value, which can avoid the phenomenon that the generated local mask area is smaller due to the smaller display area of the eye area and mouth area, which is caused by the increased brightness of the eye area and mouth area in the process of Gamma correction. If the generated local mask area is too small, the local mask area will not match the target facial feature area of the first face sample image before brightness adjustment, thus affecting the fusion of the first face sample image and the second face sample image. By performing Gaussian blur on the candidate local mask image, the area of the candidate local mask image can be expanded, thereby improving the fusion effect of the first face sample image and the second face sample image.

In an embodiment, after obtaining the incomplete mask image, the training method according to an embodiment of the present disclosure may further include: performing Gaussian blur on the incomplete mask image, so as to perform the fusion of the first face sample image and the second face sample image based on the incomplete mask image after Gaussian blur, to obtain the third face sample image after brightness adjustment.

By performing Gaussian blur on the incomplete mask image, the boundary of the incomplete mask image can be weakened, and the display of the boundary is not obvious, so as to optimize the display effect of the third face sample image after brightness adjustment.

As an example, the pixel value distribution of the first face sample image is expressed as I, and the pixel value distribution of the second face sample image after Gamma correction is expressed as $I_g$. The pixel value distribution of the incomplete mask image after Gaussian blur is expressed as Mout (for the case where Gaussian blur is not performed, Mout may directly represent the pixel value distribution of the incomplete mask image), the pixel value inside the selection area of the mask image (the selection area refers to the remaining face area except the target facial feature area of the face area) is expressed as P, and the pixel value distribution of the third face sample image after brightness adjustment is expressed as $I_{out}$. The first face sample image and the second face sample image may be fused according to the following formula to obtain the third face sample image after brightness adjustment. The formula is as follows:

$$I_{out}=I_g\cdot(P-M\text{out})+I\cdot M\text{out};$$

where $I_g\cdot(P-\text{Mout})$ represents the image area of the second face sample image after removing the target facial feature area, I·Mout represents the image area of the first face sample image, and $I_{out}$ represents the image area obtained by fusing the target facial feature area of the first face sample image into the image area of the second face sample image after removing the target facial feature area.

Taking the case that the pixel value P inside the selection area of the mask image equals to 1 as an example, the above formula can be expressed as:

$$I_{out}=I_g\cdot(1-M\text{out})+I\cdot M\text{out}.$$

Figure 9:
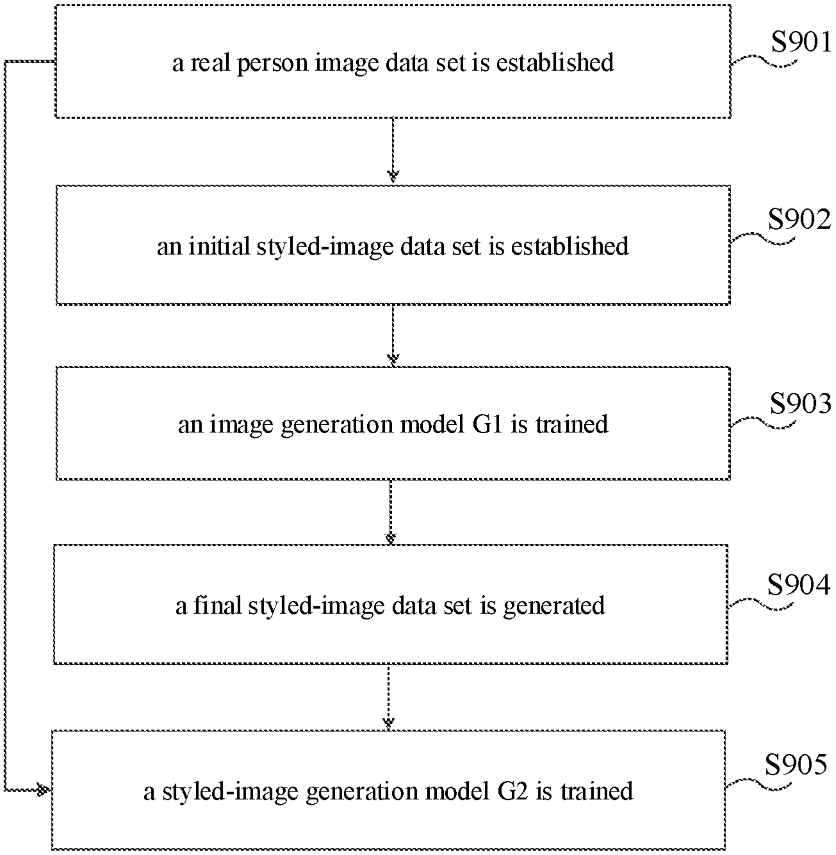
FIG. 9 is a flowchart of a method for training a styled-image generation model according to another embodiment of the present disclosure.

FIG. 9 is a flowchart of the method for training a styled-image generation model according to another embodiment of the present disclosure, which gives an exemplary description of the training process of the styled-image generation model in the embodiments of the present disclosure, but it should not be understood as a specific limitation of the embodiments of the present disclosure. As shown in FIG. 9, the training method of the style image generation model may include the following steps.

In step S901, a real person image data set is established.

The real person image data set refers to the data set obtained by performing face recognition and face area position adjustment (or face alignment) on original real person images. For the realization of face area position adjustment, the explanation of the aforementioned embodiments may be referred to.

In step S902, an initial styled-image data set is established.

The initial styled-image data set may refer to the styled-images drawn by professional painters for a preset number of images in the real person image data set according to the required styled-images. The embodiments of the present disclosure are not specifically limited. The number of images included in the initial styled-image data set may also be determined according to training needs. The fineness and style of each styled-image in the initial styled-image data set are consistent.

In step S903, an image generation model G1 is trained.

The image generation model G1 is used to generate training sample data, which are the styled-images, for training the styled-image generation model G2, during the training process of the styled-image generation model G2. The image generation model G1 may include any model with image generation function, such as the Generic Adversary Network (GAN) model. Specifically, the image generation model may be trained based on the initial styled-image data set.

In step S904, a final styled-image data set is generated.

As an example, the trained image generation model G1 may be used to generate the final styled-image data set. Taking a case where the image generation model G1 is the GAN model as an example, generating the final styled-image data set includes: obtaining the random feature vector used to generate the final styled-image data set and the element of the random feature vector associated with the image feature, the image feature including at least one of light, face orientation and hair color; inputting the random feature vector into the GAN model; controlling the value of the element of the random feature vector associated with the image feature; inputting the random feature vector with the value of the element being controlled into the trained GAN model; and generating the final styled-image data set. The final styled-image data set may include a large number of styled-images with uniform image feature distribution, thus ensuring the training effect of the style image generation model.

In step S905, a styled-image generation model G2 is trained.

Specifically, based on the aforementioned real person image data set and the final styled-image data set, the styled-image generation model is trained. The styled-image generation model G2 may include, but not limited to, any network model supporting non-aligned training, such as the Conditional Generic Adversary Network (CGAN) model, and the Cycle Consistent Adversary Network (Cycle GAN) model, etc.

Through the technical solution of the embodiments of the present disclosure, the styled-image generation model with styled-image generation function is trained, which improves the implementation effect of image style conversion and increases the interest of image editing and processing.

In addition, it should be noted that in the embodiments of this disclosure, for the model training stage and the styled-image generation stage, the same wording is used when describing the technical solutions and the meaning of the wording should be understood in combination with the specific implementation stage.

Figure 10:
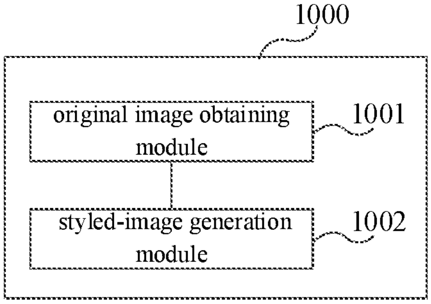
FIG. 10 is a structural diagram of a styled-image generation apparatus according to an embodiment of the present disclosure.

FIG. 10 is a structural diagram of a style image generation device according to embodiments of the present disclosure. The embodiments of the present disclosure may be applicable to generating styled-images of any style based on the original face images. The image style mentioned in the embodiments of the present disclosure may refer to image effects, such as Japanese comic style, European and American cartoon style, oil painting style, sketch style, or cartoon style, which may be determined according to the classification of image styles in the image processing field. The styled-image generation apparatus according to the embodiments of the present disclosure may be implemented in software and/or hardware, and may be integrated on any electronic device with computing capability, such as a terminal, a server, etc. The terminal may include, but not be limited to, an intelligent mobile terminal, a tablet computer, a personal computer, etc.

As shown in FIG. 10, the styled-image generation apparatus 1000 according to the embodiment of the present disclosure may include an original image obtaining module 1001 and a styled-image generation module 1002.

The original image obtaining module 1001 is configured to obtain an original face image.

The styled-image generation module 1002 is configured to obtain a target styled face image corresponding to the original face image by using a pre-trained styled-image generation model.

The styled-image generation model is trained based on multiple original face sample images and multiple target styled face sample images, and multiple target styled face sample images are generated with a pre-trained image generation model, and the image generation model is trained based on multiple pre-obtained standard styled face sample images.

In an embodiment, the styled-image generation apparatus according to the embodiment of the present disclosure also includes:

- a face recognition module, configured for recognizing a face area in the original face image; and
- a face position adjustment module, configured to adjust a position of the face area in the original face image according to actual position information and preset position information of the face area in the original face image, to obtain a first face image undergone adjustment.

Accordingly, the styled-image generation module 1002 is specifically configured to obtain the corresponding target styled face image based on the first face image by using the styled-image generation model.

In an embodiment, the face position adjustment module includes:

a first position obtaining unit, configured to obtain actual positions of at least three target reference points in the face area;

a second position obtaining unit, configured to obtain preset positions of the at least three target reference points;

a position adjustment matrix construction unit, configured to construct a position adjustment matrix based on the actual positions of the at least three target reference points and the preset positions of the at least three target reference points; and a face position adjustment unit, configured to adjust the position of the face area in the original face image based on the position adjustment matrix.

In an embodiment, the at least three target reference points include a left eye area reference point, a right eye area reference point, and a nose reference point.

In an embodiment, the left eye area reference point includes the left eye central reference point, the right eye area reference point includes the right eye central reference point, and the nose reference point includes the nose tip reference point.

Accordingly, the second position obtaining unit includes:

a first obtaining sub-unit, configured to obtain preset position coordinates of the nose tip reference point;

a second obtaining sub-unit, configured to obtain preset cropping ratio and preset target resolution; and a third obtaining sub-unit, configured to preset position coordinates of the left eye central reference point and the right eye central reference point based on the preset position coordinates of the nose tip reference point, the preset cropping ratio and the preset target resolution.

In an embodiment, the first position obtaining unit is specifically configured to perform key points detection on the original face image to obtain the actual position coordinates of the at least three target reference points in the face area.

In an embodiment, the styled-image generation module 1002 includes:

a Gamma correction unit, configured to correct a pixel value of the first face image according to a preset Gamma value to obtain a second face image after Gamma correction;

a brightness normalization unit, configured to normalize brightness of the second face image to obtain a third face image after brightness adjustment; and a styled-image generation unit, configured to generate a corresponding target styled face image based on the third face image by using the styled-image generation model.

In an embodiment, the brightness normalization unit includes:

a key point extraction sub-unit, configured to extract the feature points of facial contour and key points of the target facial feature area based on the first face image or the second face image;

a full face mask image generation sub-unit, configured to generate the full face mask image according to the feature points of facial contour;

a local mask image generation sub-unit, configured to generate the local mask image according to the key points of the target facial feature area, the local mask image including an eye area mask and/or a mouth area mask of the face area;

an incomplete mask image generation sub-unit, configured to subtract a pixel value of the local mask image from a pixel value of the full face mask image, to obtain an incomplete mask image; and an image fusion processing sub-unit, configured to fuse the first face image and the second face image based on the incomplete mask image to obtain the third face image after brightness adjustment.

In an embodiment, the local mask image generation sub-unit includes:

a candidate local mask image generation sub-unit, configured to generate a candidate local mask image according to the key points of the target facial feature area, the candidate local mask image including the eye area mask and/or the mouth area mask;

a local mask image blurring sub-unit, configured to perform Gaussian blur on the candidate local mask image; and a local mask image determination sub-unit, configured to select, based on the candidate local mask image after the Gaussian blur, an area with a pixel value being greater than a preset threshold to generate the local mask image.

In an embodiment, the brightness normalization unit further includes:

an incomplete mask image blurring sub-unit, configured to, after the incomplete mask image generation sub-unit subtracts the pixel value of the local mask image from the pixel value of the full face mask image to obtain the incomplete mask image, perform Gaussian blur on the incomplete mask image.

The image fusion processing sub-unit is specifically configured to fuse the first face image and the second face image based on the incomplete mask image after Gaussian blur to obtain the third face image after brightness adjustment.

In an embodiment, the styled-image generation model includes a Conditional Generic Adversary Network (CGAN) model.

The styled-image generation device according to the embodiments of the present disclosure may execute any style image generation method according to the embodiments of the present disclosure, and has the corresponding functional modules and beneficial effects. The contents not described in detail in the embodiments of the device of the present disclosure may refer to the descriptions in the embodiments of any method of the present disclosure.

Figure 11:
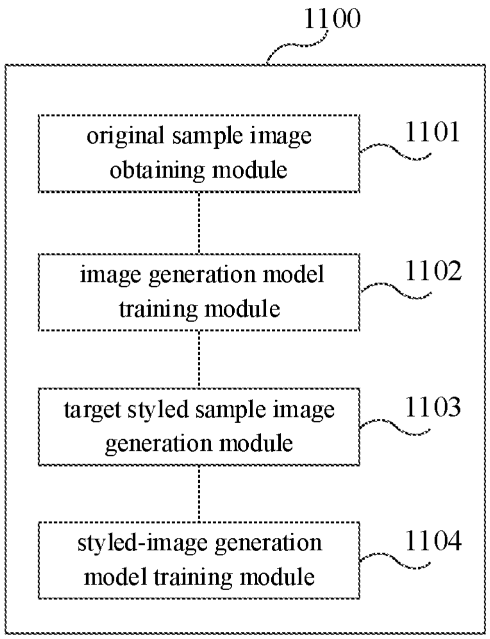
FIG. 11 is a structural diagram of an apparatus for training a styled-image generation model according to an embodiment of the present disclosure.

FIG. 11 is a structural diagram of an apparatus for training a styled-image generation model according to an embodiment of the present disclosure. The embodiments of the present disclosure can be applied to train a styled-image generation model, which is used to generate a styled-image corresponding to the original face image. The image style mentioned in the embodiments of the present disclosure may refer to image effects, such as Japanese comic style, European and American cartoon style, oil painting style, sketch style, or cartoon style, which may be determined according to the classification of image styles in the image processing field. The training apparatus for the styled-image generation model according to the embodiments of the present disclosure may be implemented in software and/or hardware, and may be integrated on any electronic device with computing capability, such as a terminal, a server, and the like.

As shown in FIG. 11, the apparatus 1100 for training the styled-image generation model according to the embodiment of the present disclosure may include an original sample image obtaining module 1101, an image generation model training module 1102, a target styled sample image generation module 1103, and a styled-image generation model training module 1104.

The original sample image obtaining module 1101 is configured to obtain an original face sample image.

The image generation model training 1102 is configured to obtain multiple standard styled face sample images, train an image generation model based on multiple standard styled face sample images, and obtain the trained image generation model.

The target styled sample image generation module 1103 is configured to generate multiple target styled face sample images with the trained image generation model.

The styled-image generation model training module 1104 is configured to train a styled-image generation model by using the multiple original face sample images and the multiple target styled face sample images to obtain the trained styled-image generation model.

In an embodiment, the target styled sample image generation module 1103 includes:

- a random feature vector obtaining unit, configured to obtain a random feature vector used to generate a target styled face sample image set; and
- a target styled sample image generation unit, configured to input the random feature vector into a trained the Generative Adversarial Network (GAN) model to generate a target styled face sample image set, the target styled face sample image set including multiple target styled face sample images meeting the image distribution requirements.

In an embodiment, the target styled sample image generation unit includes:

- a vector element obtaining sub-unit, configured to obtain an element of the random feature vector associated with an image feature of the target styled face sample image set to be generated; and
- a vector element value control sub-unit, configured to control a value of the element associated with the image feature according to the image distribution requirements, and inputting the random feature vector with the value of the element being controlled into the trained GAN model to generate the target styled face sample image set.

In an embodiment, the image feature includes at least one of light, face orientation, and hair color.

In an embodiment, the apparatus for training the styled-image generation model according to an embodiment of the present disclosure also includes:

- a face recognition module, configured to recognize the face area in each original face sample image after the original sample image obtaining module 1101 performs the operation of obtaining multiple original face sample images; and
- a face position adjustment module, configured to adjust the position of the face area in the original face sample image according to the actual position information and the preset position information of the face area in the original face sample image, to obtain the first face sample image undergone adjustment, so as to train the styled-image generation model by using multiple first face sample images and multiple target styled face sample images.

In an embodiment, the face position adjustment module includes:

- a first position obtaining unit, configured to obtain actual positions of at least three target reference points in the face area;
- a second position obtaining unit, configured to obtain preset positions of the at least three target reference points;
- a position adjustment matrix construction unit, configured to construct a position adjustment matrix based on the actual positions of the at least three target reference points and the preset positions of the at least three target reference points; and
- a face position adjustment unit, configured to adjust the position of the face area in the original face sample image based on the position adjustment matrix.

In an embodiment, the at least three target reference points include a left eye area reference point, a right eye area reference point, and a nose reference point.

In an embodiment, the left eye area reference point includes the left eye central reference point, the right eye area reference point includes the right eye central reference point, and the nose reference point includes the nose tip reference point.

Accordingly, the second position obtaining unit includes:

- a first obtaining sub-unit, configured to obtain preset position coordinates of the nose tip reference point;
- a second obtaining sub-unit, configured to obtain preset cropping ratio and preset target resolution; and
- a third obtaining sub-unit, configured to preset position coordinates of the left eye central reference point and the right eye central reference point based on the preset position coordinates of the nose tip reference point, the preset cropping ratio and the preset target resolution.

In an embodiment, the first position obtaining unit is specifically configured to perform key point detection on the original face sample image to obtain the actual position coordinates of the at least three target reference points in the face area.

In an embodiment, the training apparatus for the styled-image generation model according to the embodiment of the present disclosure also includes:

- a Gamma correction unit, configured to correct a pixel value of the first face sample image according to a preset Gamma value to obtain a second face sample image after Gamma correction, after the face position adjustment module performs the operation of adjusting the position of the face area in the original face sample image based on the position adjustment matrix and obtaining the adjusted first face sample image; and
- a brightness normalization unit, configured to normalize brightness of the second face sample image to obtain a third face sample image after brightness adjustment.

In an embodiment, the image generation model training module 1102 may obtain multiple standard styled face sample images based on the third face sample image.

In an embodiment, the brightness normalization module includes:

- a key point extraction unit, configured to extract the feature points of facial contour and key points of the target facial feature area based on the first face sample image or the second face sample image;
- a full face mask image generation unit, configured to generate the full face mask image according to the feature points of facial contour;
- a local mask image generation unit, configured to generate the local mask image according to the key points of the target facial feature area, the local mask image including an eye area mask and/or a mouth area mask of the face area;

an incomplete mask image generation unit, configured to subtract a pixel value of the local mask image from a pixel value of the full face mask image, to obtain an incomplete mask image; and an image fusion processing unit, configured to fuse the first face sample image and the second face sample image based on the incomplete mask image to obtain the third face sample image after brightness adjustment, so as to train the styled-image generation model based on multiple third face sample images and multiple target styled face sample images.

In an embodiment, the local mask image generation unit includes:

a candidate local mask image generation sub-unit, configured to generate a candidate local mask image according to the key points of the target facial feature area, the candidate local mask image including the eye area mask and/or the mouth area mask;

a local mask image blurring sub-unit, configured to perform Gaussian blur on the candidate local mask image; and a local mask image determination sub-unit, configured to select, based on the candidate local mask image after the Gaussian blur, an area with a pixel value being greater than a preset threshold to generate the local mask image.

In an embodiment, the brightness normalization unit also includes:

an incomplete mask image blurring sub-unit, configured to perform Gaussian blur on the incomplete mask image, after the incomplete mask image generation unit performs the operation of subtracting the pixel value of the local mask image from the pixel value of the full face mask image to obtain the incomplete mask image, so as to perform the fusion operation of the first face sample image and the second face sample image based on the incomplete mask image after Gaussian blurring.

The apparatus for training the styled-image generation model according to the embodiments of the present disclosure may execute any method for training the styled-image generation model according to the embodiments of the present disclosure, and has the corresponding functional module and beneficial effects of executing the method. The contents not described in detail in the embodiments of the apparatus of the present disclosure may refer to the descriptions in the embodiments of any method of the present disclosure.

It should be noted that in the embodiment of the present disclosure, there are some modules or units with the same name in the styled-image generation apparatus and the apparatus for training the styled-image generation model. It can be understood by those skilled in the art that, for different image processing stages, the specific functions of the module or unit should be understood in combination with the specific image processing stage, rather than being separated from the specific image processing stage and confusing the functions of the modules or units.

Figure 12:
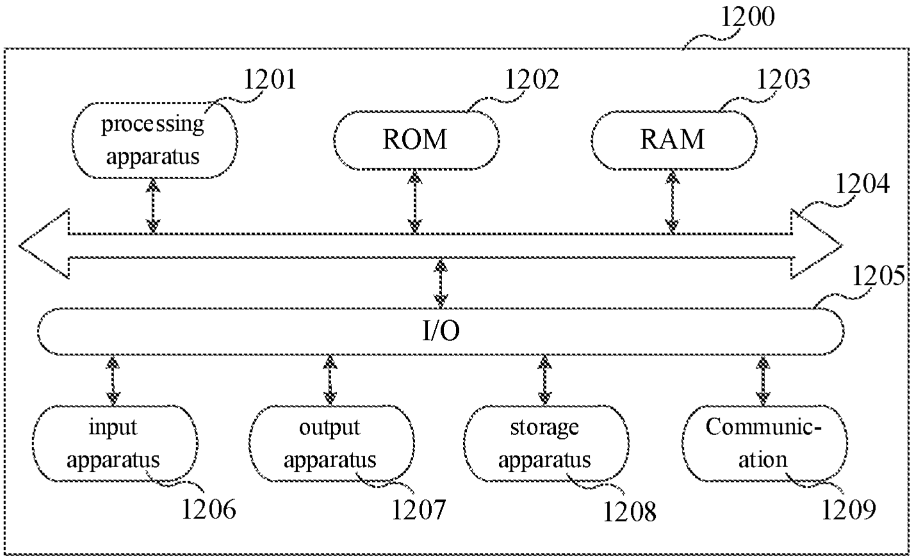
FIG. 12 is a structural diagram of an electronic device according to an embodiment of the present disclosure.

FIG. 12 is a structural diagram of an electronic device according to an embodiment of the present disclosure, which is used to give an exemplary description of an electronic device used to execute a styled-image generation method or a training method used to execute a styled-image generation model in the examples of the present disclosure. The electronic devices in the embodiments of the present disclosure may include, but not limited to, mobile terminals such as mobile phones, laptops, digital broadcast receivers, personal digital assistants (PDA), tablet computers (PAD), portable multimedia players (PMP), vehicle terminals (such as vehicle navigation terminals), and fixed terminals such as digital TVs, desktop computers, and the like. The electronic device shown in FIG. 12 is only an example, and there should be no restrictions on the function and scope of use of the embodiments of the present disclosure.

As shown in FIG. 12, the electronic device 1200 may include a processing apparatus (such as a central processor, a graphics processor, etc.) 1201, which may perform various appropriate actions and processes according to a program stored in a read-only memory (ROM) 1202 or a program loaded from a storage apparatus 1208 into a random access memory (RAM) 1203. RAM 1203 also stores various programs and data required for the operation of electronic device 1200. The processing device 1201, ROM 1202 and RAM 1203 are connected to each other through bus 1204. The input/output (I/O) interface 1205 is also connected to bus 1204. ROM 1202, RAM 1203 and storage apparatus 1208 shown in FIG. 12 may be collectively referred to as memory for storing executable instructions or programs of processing device 1001.

Generally, the following apparatus can be connected to the I/O interface 1205: an input apparatus 1206 including, for example, a touch screen, a touch pad, a keyboard, a mouse, a camera, a microphone, an accelerometer, a gyroscope, and the like; an output apparatus 1207 including, for example, a liquid crystal display (LCD), a loudspeaker, a vibrator, and the like; a storage apparatus 1208 including, for example, a tape, a hard disk, and the like; and a communication apparatus 1209. Communication apparatus 1209 may allow electronic device 1200 to communicate wirelessly or wirelessly with other devices to exchange data. Although FIG. 12 shows an electronic device 1200 with various apparatus, it should be understood that not all of the illustrated devices are required to be implemented or provided. More or fewer devices may alternatively be implemented or provided.

In particular, according to the embodiments of the present disclosure, the process described above with reference to the flowchart can be implemented as a computer software program. For example, embodiments of the present disclosure include a computer program product, which includes a computer program carried on a non-transient computer-readable medium, and the computer program includes program code for executing the method shown in the flowchart, such as a training method for executing a styled-image generation method or a styled-image generation model. In such an embodiment, the computer program may be downloaded and installed from the network through the communication apparatus 1209, or installed from the storage apparatus 1208, or installed from the ROM 1202. When the computer program is executed by the processing device 1201, the above functions defined in the method of the embodiment of the present disclosure are executed.

It should be noted that the computer-readable medium described in the present disclosure may be a computer-readable signal medium, a computer-readable storage medium, or any combination of the two. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: electrical connections with one or more wires, portable computer disks, hard disks, random access memories (RAM), read-only memories (ROM), erasable programmable read-only memories (EPROM or flash memory), optical fibers, portable compact disk read-only memories (CD-ROM), optical storage devices, magnetic storage devices or any suitable combination of the above. In the embodiment of the present disclosure, the computer-readable storage medium may be any tangible medium containing or storing a program, which can be used by or in combination with an instruction execution system, apparatus or device. In the embodiment of the present disclosure, the computer-readable signal medium may include data signals that are propagated in the baseband or as part of the carrier, and carry computer-readable program code. Such transmitted data signals may take various forms, including but not limited to electromagnetic signals, optical signals or any suitable combination of the above. The computer-readable signal medium may also be any computer-readable medium other than a computer-readable storage medium, which may transmit, propagate, or transmit programs for use by or in combination with an instruction execution system, apparatus, or device. The program code contained on the computer readable medium can be transmitted with any appropriate medium, including but not limited to: wire, optical cable, RF (radio frequency), etc., or any appropriate combination of the above.

In some embodiments, clients and servers can communicate using any currently known or future developed network protocol, such as HTTP (HyperText Transfer Protocol), and can be interconnected with digital data communications in any form or medium, such as communication networks. Examples of communication networks include local area networks (LANs), wide area networks (WANs), the Internet (e.g., the Internet), and end-to-end networks (e.g., ad hoc end-to-end networks), as well as any networks that are currently known or will be developed in the future.

The computer-readable medium may be included in the electronic device, and it can also exist independently without being assembled into the electronic device.

The computer-readable medium according to the embodiment of the present disclosure carries one or more programs. When the one or more programs are executed by the electronic device, the electronic device: obtains an original face image; and obtains a target styled face image corresponding to the original face image by using a pre-trained styled-image generation model; where the styled-image generation model is obtained by training with multiple original face sample images and multiple target styled face sample images, the multiple target styled face sample images are generated by using a pre-trained image generation model, and the image generation model is obtained by training with multiple pre-obtained standard styled face sample images.

Or, the computer-readable medium according to the embodiment of the present disclosure carries one or more programs. When the above one or more programs are executed by the electronic device, the electronic device: obtains multiple original face sample images; obtains multiple standard styled face sample images; trains an image generation model based on the multiple standard styled face sample images to obtain a trained image generation model; generates multiple target styled face sample images with the trained image generation model; and trains a styled-image generation model by using the multiple original face sample images and the multiple target styled face sample images to obtain a trained styled-image generation model.

It should be noted that when one or more programs stored in a computer-readable medium are executed by the electronic device, the electronic device may also be enabled to execute other styled-image generation methods or other styled-image generation model training methods according to the examples of the disclosure.

In the embodiments of the present disclosure, computer program code for performing the operations of the present disclosure can be written in one or more programming languages or a combination thereof. The above programming languages include but are not limited to object-oriented programming languages, such as Java, Smalltalk, C++, and also include conventional procedural programming languages, such as "C" language or similar programming languages. The program code may be executed completely on the user computer, partially on the user computer, as an independent software package, partially on the user computer, partially on the remote computer, or completely on the remote computer or server. In the case involving a remote computer, the remote computer may be connected to the user computer through any kind of network, including a local area network (LAN) or a wide area network (WAN), or may be connected to an external computer (for example, using an Internet service provider to connect through the Internet).

The flowchart and block diagram in the accompanying drawings illustrate the possible architectures, functions and operations of the systems, methods and computer program products according to various embodiments of the present disclosure. In this regard, each block in a flowchart or block diagram may represent a module, program segment, or part of a code that contains one or more executable instructions for implementing a specified logical function. It should also be noted that in some alternative implementations, the functions marked in the block may also occur in a different order from those marked in the drawings. For example, two consecutive boxes can actually be executed basically in parallel, or they can sometimes be executed in reverse order, depending on the function involved. It should also be noted that each block in the block diagram and/or flow diagram, and the combination of the blocks in the block diagram and/or flow diagram, can be implemented with a dedicated hardware based system that performs a specified function or operation, or can be implemented with a combination of dedicated hardware and computer instructions.

The modules or units described in the embodiments of the present disclosure can be realized by software or hardware. The name of the module or unit does not constitute a limitation on the module or unit itself in some cases. For example, the original image obtaining module may also be described as "the module for obtaining the original face image".

The functions described above herein may be performed at least partially by one or more hardware logical units. For example, without limitation, exemplary types of hardware logic components that can be used include: field programmable gate array (FPGA), application specific integrated circuit (ASIC), application specific standard product (ASSP), system on chip (SOC), complex programmable logic device (CPLD), and so on.

In the context of the present disclosure, a machine-readable medium may be a tangible medium, which may contain or store programs for use by or in combination with an instruction execution system, device or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination of the foregoing. A more specific example of a machine-readable storage medium would include an electrical connection based on one or more lines, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

It should be noted that in this paper, relational terms such as "first" and "second" are only used to distinguish one entity or operation from another entity or operation, and do not necessarily require or imply any such actual relationship or order between these entities or operations. Moreover, the terms "comprising", "including" or any other variant thereof are intended to cover non-exclusive inclusion, so that a process, method, article or equipment including a series of elements not only includes those elements, but also includes other elements not explicitly listed, or also includes elements inherent to such process, method, article or equipment. Without more restrictions, the elements defined by the statement "including one . . . " do not exclude that there are other identical elements in the process, method, article or equipment including the elements.

The above is only a specific embodiment of the disclosure, enabling those skilled in the art to understand or realize the disclosure. A variety of modifications to these embodiments will be apparent to those skilled in the art. The general principles defined herein can be implemented in other embodiments without departing from the spirit or scope of the disclosure. Therefore, the disclosure will not be limited to these embodiments herein, but will conform to the widest scope consistent with the principles and novel features disclosed herein.

The invention claimed is:

1. A styled-image generation method, comprising:
obtaining an original face image; and
obtaining a target styled face image corresponding to the original face image, by using a pre-trained styled-image generation model;
wherein the pre-trained styled-image generation model is obtained by training with a plurality of original face sample images and a plurality of target styled face sample images, the plurality of target styled face sample images are generated by a pre-trained image generation model, and the pre-trained image generation model is obtained by training with a plurality of pre-obtained standard styled face sample images,
wherein after the obtaining the original face image, the method further comprises:
recognizing a face area in the original face image; and
adjusting a position of the face area in the original face image according to actual position information and preset position information of the face area in the original face image, to obtain a first face image;
wherein the obtaining the target styled face image corresponding to the original face image, by using the pre-trained styled-image generation model, comprising:
obtaining the target styled face image based on the first face image, by using the pre-trained styled-image generation model,
wherein the obtaining the target styled face image based on the first face image by using the pre-trained styled-image generation model comprises:
correcting a pixel value of the first face image according to a preset Gamma value to obtain a second face image;
performing brightness normalization on the second face image to obtain a third face image; and
obtaining the target styled face image based on the third face image, by using the pre-trained styled-image generation model.

2. The method according to claim 1, wherein the adjusting a position of the face area in the original face image according to actual position information and preset position information of the face area in the original face image comprises:
obtaining actual positions of at least three target reference points in the face area;
obtaining preset positions of the at least three target reference points;
constructing a position adjustment matrix based on the actual positions of the at least three target reference points and the preset positions of the at least three target reference points; and
adjusting the position of the face area in the original face image based on the position adjustment matrix.

3. The method according to claim 2, wherein the at least three target reference points comprise a left eye area reference point, a right eye area reference point and a nose reference point.

4. The method according to claim 3, wherein the left eye area reference point comprises a left eye central reference point, the right eye area reference point comprises a right eye central reference point, and the nose reference point comprises a nose tip reference point;
wherein the obtaining preset positions of the at least three target reference points comprises:
obtaining preset position coordinates of the nose tip reference point;
obtaining preset cropping ratio and preset target resolution; and
obtaining preset position coordinates of the left eye central reference point and preset position coordinates of the right eye central reference point based on the preset position coordinates of the nose tip reference point, the preset cropping ratio and the preset target resolution.

5. The method according to claim 2, wherein the obtaining actual positions of at least three target reference points in the face area comprises:
performing key point detection on the original face image to obtain actual position coordinates of the at least three target reference points in the face area.

6. The method according to claim 1, wherein the performing brightness normalization on the second face image to obtain a third face image comprises:
extracting, based on the first face image or the second face image, feature points of facial contour and key points of a target facial feature area;
generating a full face mask image according to the feature points of facial contour, the full face mask image comprising a face area mask;
generating a local mask image according to the key points of the target facial feature area, the local mask image comprising at least one of an eye area mask and a mouth area mask in the face area;
subtracting a pixel value of the local mask image from a pixel value of the full face mask image to obtain an incomplete mask image, the incomplete mask image comprising a mask of a remaining face area in the face area except the target facial feature area; and fusing the first face image and the second face image based on the incomplete mask image, to obtain the third face image.

7. The method according to claim 6, wherein the generating a local mask image according to the key points of the target facial feature area comprises:

generating a candidate local mask image according to the key points of the target facial feature area, the candidate local mask image comprising at least one of the eye area mask and the mouth area mask;

performing Gaussian blur on the candidate local mask image; and selecting, based on the candidate local mask image after the Gaussian blur, an area with a pixel value being greater than a preset threshold, to generate the local mask image.

8. The method according to claim 6, wherein after the subtracting a pixel value of the local mask image from a pixel value of the full face mask image to obtain an incomplete mask image, the method further comprises:

performing Gaussian blur on the incomplete mask image;

wherein the fusing the first face image and the second face image based on the incomplete mask image to obtain the third face image comprises:

fusing the first face image and the second face image based on the incomplete mask image after the Gaussian blur, to obtain the third face image.

9. The method according to claim 1, wherein the pre-trained styled-image generation model comprises a Conditional Generative Adversarial Network model.

10. The method according to claim 1, wherein the pre-trained styled-image generation model is trained by:

obtaining the plurality of original face sample images;

obtaining a plurality of standard styled face sample images;

training an image generation model based on the plurality of standard styled face sample images to obtain a trained image generation model;

generating the plurality of target styled face sample images by using the trained image generation model; and training a styled-image generation model by using the plurality of original face sample images and the plurality of target styled face sample images, to obtain a trained styled-image generation model, wherein the trained styled-image generation model is used in styled-image generation as the pre-trained styled-image generation model.

11. The method according to claim 10, wherein the image generation model comprises a Generative Adversarial Network model, and the generating a plurality of target styled face sample images by using the trained image generation model comprises:

obtaining a random feature vector used for generating a target styled face sample image set; and inputting the random feature vector into a trained Generative Adversarial Network model to generate the target styled face sample image set, the target styled face sample image set comprising a plurality of target styled face sample images meeting image distribution requirements.

12. The method according to claim 11, wherein the inputting the random feature vector into a trained Generative Adversarial Network model to generate the target styled face sample image set comprises:

obtaining an element of the random feature vector associated with an image feature of the target styled face sample image set to be generated; and controlling, according to the image distribution requirements, a value of the element associated with the image feature, and inputting the random feature vector with the value of the element being controlled into the trained Generative Adversarial Network model, to generate the target styled face sample image set.

13. The method according to claim 12, wherein the image feature comprises at least one of light, face orientation and hair color.

14. A styled-image generation apparatus, comprising:

a processor; and a memory for storing instructions executable by the processor;

wherein the processor is configured to read the executable instructions from the memory and execute the executable instructions to:

obtain an original face image; and obtain a target styled face image corresponding to the original face image by using a pre-trained styled-image generation model;

wherein the pre-trained styled-image generation model is obtained by training with a plurality of original face sample images and a plurality of target styled face sample images, the plurality of target styled face sample images are generated by a pre-trained image generation model, and the image generation model is obtained by training with a plurality of pre-obtained standard styled face sample images, the processor is further configured to: after the obtaining an original face image, recognize a face area in the original face image; and adjust a position of the face area in the original face image according to actual position information and preset position information of the face area in the original face image, to obtain a first face image, wherein the obtaining a target styled face image corresponding to the original face image, by using a pre-trained styled-image generation model, comprising:

obtaining the target styled face image based on the first face image, by using the pre-trained styled-image generation model, wherein the obtaining the target styled face image based on the first face image by using the pre-trained styled-image generation model comprises:

correcting a pixel value of the first face image according to a preset Gamma value to obtain a second face image;

performing brightness normalization on the second face image to obtain a third face image; and obtaining the target styled face image based on the third face image, by using the pre-trained styled-image generation model.

15. The apparatus according to claim 14, wherein the processor is further configured to read the executable instructions from the memory and execute the executable instructions to:

obtain the plurality of original face sample images;

obtain a plurality of standard styled face sample images, and to train an image generation model based on the plurality of standard styled face sample images to obtain a trained image generation model;

generate the plurality of target styled face sample images by using the trained image generation model; and train a styled-image generation model by using the plurality of original face sample images and the plurality of target styled face sample images to obtain a trained styled-image generation model, wherein the trained styled-image generation model is used in styled-image generation as the pre-trained styled-image generation model.

16. A non-transitory storage medium, wherein the storage medium stores a computer program, when the computer program is executed by a processor, cause the processor to implement:

obtaining an original face image; and obtaining a target styled face image corresponding to the original face image, by using a pre-trained styled-image generation model;

wherein the pre-trained styled-image generation model is obtained by training with a plurality of original face sample images and a plurality of target styled face sample images, the plurality of target styled face sample images are generated by a pre-trained image generation model, and the pre-trained image generation model is obtained by training with a plurality of pre-obtained standard styled face sample images, wherein the computer program further causes the processor to implement: after the obtaining an original face image, recognizing a face area in the original face image; and adjusting a position of the face area in the original face image according to actual position information and preset position information of the face area in the original face image, to obtain a first face image, wherein the obtaining a target styled face image corresponding to the original face image, by using a pre-trained styled-image generation model, comprising:

obtaining the target styled face image based on the first face image, by using the pre-trained styled-image generation model, wherein the obtaining the target styled face image based on the first face image by using the pre-trained styled-image generation model comprises:

correcting a pixel value of the first face image according to a preset Gamma value to obtain a second face image;

performing brightness normalization on the second face image to obtain a third face image; and obtaining the target styled face image based on the third face image, by using the pre-trained styled-image generation model.

17. The non-transitory storage medium according to claim 16, wherein the storage medium stores a computer program, when the computer program is executed by a processor, cause the processor to implement:

obtaining the plurality of original face sample images;

obtaining a plurality of standard styled face sample images;

training an image generation model based on the plurality of standard styled face sample images to obtain a trained image generation model;

generating the plurality of target styled face sample images by using the trained image generation model; and training a styled-image generation model by using the plurality of original face sample images and the plurality of target styled face sample images, to obtain a trained styled-image generation model, wherein the trained styled-image generation model is used in styled-image generation as the pre-trained styled-image generation model.

* * * * *